(12) United States Patent
Haq et al.

(10) Patent No.: US 12,105,729 B1
(45) Date of Patent: Oct. 1, 2024

(54) SYSTEM AND METHOD FOR PROVIDING A GOVERNED SEARCH PROGRAM USING GENERATIVE AI AND LARGE LANGUAGE LEARNING MODELS

(71) Applicant: Aretec, Inc., Fairfax, VA (US)

(72) Inventors: Waqas Haq, Fairfax, VA (US); Anthony Rivera, Fairfax, VA (US); Roby Luna, Fairfax, VA (US)

(73) Assignee: Aretec, Inc., Fairfax, VA (US)

(*) Notice: Subject to any disclaimer, the term of this patent is extended or adjusted under 35 U.S.C. 154(b) by 0 days.

(21) Appl. No.: 18/388,071

(22) Filed: Nov. 8, 2023

(51) Int. Cl.
*G06F 16/25* (2019.01)
*G06F 16/338* (2019.01)
*G06F 40/205* (2020.01)
*G06F 40/40* (2020.01)

(52) U.S. Cl.
CPC .......... *G06F 16/258* (2019.01); *G06F 16/338* (2019.01); *G06F 40/205* (2020.01); *G06F 40/40* (2020.01)

(58) Field of Classification Search
CPC .... G06F 16/258; G06F 16/338; G06F 40/205; G06F 40/40
See application file for complete search history.

(56) References Cited

U.S. PATENT DOCUMENTS

| | | | |
|---|---|---|---|
| 2019/0108274 A1* | 4/2019 | Daboll-Lavoie | G06F 16/3338 |
| 2023/0259507 A1* | 8/2023 | Infante | G06F 16/258 707/756 |
| 2023/0289538 A1* | 9/2023 | Goel | G06F 40/30 |
| 2023/0368284 A1* | 11/2023 | Sheikh | H04L 9/3239 |

* cited by examiner

*Primary Examiner* — Richard L Bowen
*Assistant Examiner* — Aryan D Toughiry
(74) *Attorney, Agent, or Firm* — MILES & STOCKBRIDGE P.C.; David R. Schaffer

(57) ABSTRACT

A system and method for providing governed search capabilities using generative artificial intelligence (AI) and large language learning models to permit users to parse and search through and to generate detailed content from both structured and unstructured datasets.

30 Claims, 30 Drawing Sheets

FIG. 13

SYSTEM AND METHOD FOR PROVIDING A GOVERNED SEARCH PROGRAM USING GENERATIVE AI AND LARGE LANGUAGE LEARNING MODELS

FIELD OF THE INVENTION

A system and method for providing governed search capabilities using generative artificial intelligence (AI) and large language learning models to permit users to parse and search through and to generate detailed content from both structured and unstructured datasets.

BACKGROUND

Businesses are experiencing unprecedented challenges associated with the surge of data, both structured and unstructured data, and the associated data chaos and information management nightmares associated with this data. Specifically, as seen in FIG. 1, businesses of all types are being buried under an avalanche of data, much of which is of their own creation, but a large portion is also out of their control. Unfortunately, this has led to massive inefficiencies and duplication of efforts in the use and re-use of this data.

SUMMARY

To confront the escalating challenges of data chaos and information management the system and method of the presently disclosed subject matter is designed to help users master and control the surge of data businesses are experiencing, enable users to securely and efficiently store and effortlessly search and access organizational data, all while safeguarding privacy. Embodiments of the presently disclosed subject matter are designed to allow organizations to parse and search through both their structured and unstructured datasets and the main components of the system can include: a governed search component; a data storage component, which can include an advanced data parser and an elastic data storage; a data identification component, which can include data classification, data categorization, and data loss prevention sub-components; a model Integration component, which can include AI integration and opensource model Integration sub-components; a governance component, which can include data domains and data contracts sub-components; an autonomous agents component, which can include proposal writing agent, search agent, and coding agent sub components; an advanced workflows component; a security component, which can include Role based access control and scope based access control sub components; and a records management component, which can permit users to assign records management rules to data domains and datasets.

Therefore, what is needed is a solution to allow organizations to efficiently and quickly organize, save, and then parse and search through both their structured and unstructured datasets and generate detailed content using generative artificial intelligence (AI) and large language models (LLMs). To optimize data comprehension and effectively manage the data deluge, the system should offer innovative solutions, which emphasize the importance of maintaining governance, privacy, and data integrity in the face of increasing data volumes while minimizing storage requirements and optimizing search times and data accuracy.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

FIG. 13 is a screenshot of the search output screen in the governed search system in FIG. 12 after a user has selected a filter menu tab with all of the filter menu options being maximized, in accordance with one or more embodiments of the disclosed subject matter.

FIG. 14-B is a screenshot of a detailed document view screen within the system, in accordance with one or more embodiments of the disclosed subject matter.

DETAILED DESCRIPTION

Figure 1:
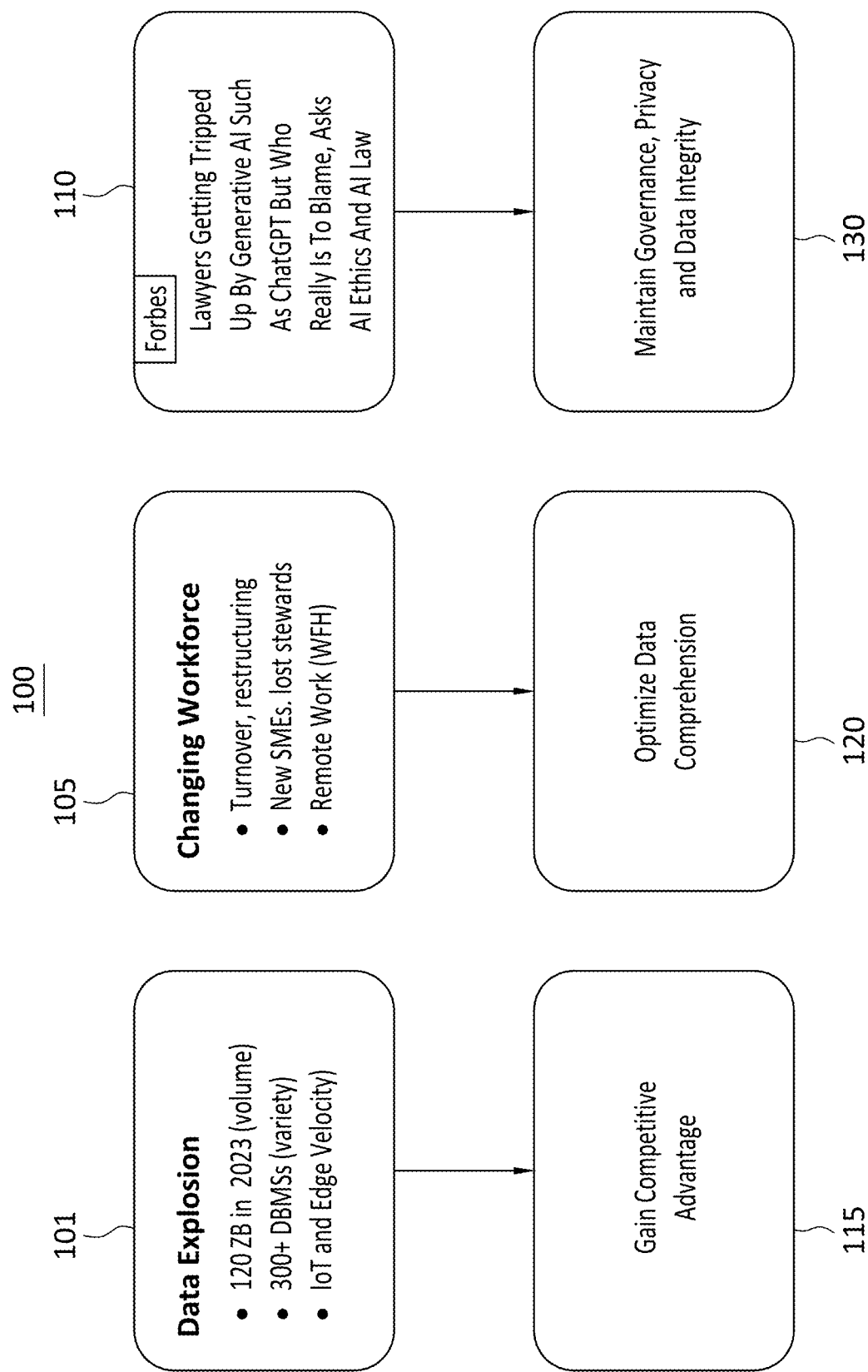
FIG. 1 is a chart illustrating some of the major sources and magnitude of the data explosion being experienced by businesses.

Embodiments of the presently disclosed subject matter are designed to allow organizations to parse and search through both their structured and unstructured datasets using active data governance, which is used interchangeably herein with active governance. Active governance is a framework for data management that involves implementing policies, procedures, and practices to manage data's lifecycle from initial creation or acquisition to eventual archival and disposal. The goal is to ensure the integrity, accessibility, and confidentiality of data throughout its lifecycle, while adhering to legal, operational, and ethical standards. Embodiments of the system can include: a governed search component; a data storage component, which can include an advanced data parser and an elastic data storage; a data identification component, which can include data classification, data Categorization, and data loss prevention sub-components; a model integration component, which can include AI integration and opensource model integration sub-components; a governance component, which can include data domains and data contracts sub-components; an autonomous agents component, which can include proposal writing agent, search agent, and coding agent sub components; an advanced workflows component; a security component, which can include role based access control and scope based access control sub components; and a records management component, which can permit users to assign records management rules to data domains and datasets. For example, in some embodiments, the system can be hosted online across various platforms and virtual machines, including, for example, but not limited to, Google Cloud Platform and E2 instances, with virtual machines having approximately 64 gigabytes of RAM and more than 1 terabyte of SSD storage. Regardless, embodiments of the system are designed to be auto scalable to dynamically adjust to increased traffic demands. For end users accessing the web-based embodiment, the system requirements are quite minimal including, for example, but not limited to, any device capable of running Google Chrome or any modern web browser with a connection to the Internet. Because the burden in terms of computing is handled by the system cloud servers, the system is accessible to a wide range of devices. If a local implementation is desired, the system can include, but is not limited to, a 7th generation Intel Core i5 processor, 16 GB of RAM, and a 1 TB hard drive.

The governed search component implements active governance, which is a framework for data management that involves implementing policies, procedures, and practices to manage data's lifecycle from initial creation or acquisition to eventual archival and disposal. The goal is to ensure the integrity, accessibility, and confidentiality of data throughout its lifecycle, while adhering to legal, operational, and ethical standards. Active governance includes various processes and activities such as data quality control, data integration, data security, data privacy, and regulatory compliance. It helps organizations understand what data they have, where it comes from, where it goes, and how it changes over time. Active governance ensures that data is accurate, consistent, and usable. It allows organizations to control data flow, manage data risk, and improve data value. When applied to the storage and retrieval of data, active governance plays a pivotal role in maintaining the security, consistency, and reliability of the data. Here's how it can be applied in the context of a data search platform, The system, which uses a vector database and search and analytics engine such as, but not limited to, the Elasticsearch® database and search and analytics engine from ElasticSearch B.V., includes the following features.

Data Quality Control. Active governance ensures the data stored in the system is of high quality, accurate, and reliable.

This can involve validation rules, normalization procedures, or anomaly detection mechanisms. For instance, any new data entering the system can be validated against predefined criteria, ensuring that it is accurate and relevant to the search platform.

Data Security. The framework enforces data security measures to protect the data in the database from unauthorized access or breaches. This can include robust user authentication processes, authorization measures (defining who has access to what data), and encryption for data at rest and in transit.

Data Privacy. Active governance ensures compliance with data privacy regulations. For example, it ensures that data is anonymized or pseudonymized when necessary, and that personal data is handled in accordance with privacy laws like the General Data Protection Regulation (GDPR), the California Consumer Privacy Act (CCPA), and other data privacy laws. This can involve setting up mechanisms to anonymize data before it is stored or retrieved.

Regulatory Compliance. An active governance framework checks that the use and storage of data complies with relevant regulations. This can include maintaining a record of data processing activities, carrying out data protection impact assessments, or appointing a data protection officer.

Data Lifecycle Management. Active governance aids in managing the entire lifecycle of data, from acquisition to disposal. For example, it ensures that obsolete or redundant data is safely deleted from the database to maintain system performance and compliance with data minimization principles.

Audit Trails. By maintaining a comprehensive log of all data actions, organizations can prove compliance with regulatory requirements and investigate any potential security incidents.

By incorporating an active governance framework, the system can ensure that its data is consistently managed, protected, and utilized in accordance with legal and ethical guidelines, enhancing its value as a secure, reliable, and efficient search platform.

Modern data management systems require nuanced access control mechanisms that consider multiple variables, such as organization, groups, data classification, and data categorization. Current solutions tend to lack this level of granularity and flexibility, creating a need for a more sophisticated, adaptable system as provided by the various embodiments of the presently described subject matter. Specifically, the system includes a data contract system feature that allows for the creation of contractual agreements between data owners and data consumers. The data contracts enable intricate control of data access based on pre-defined parameters including organization affiliations, group memberships, data classifications, and data categories. As result, the data contract system significantly enhances the security, usability, and efficiency of the system platform.

Data Contract Creation. The data contract system allows data owners to create specific contracts that dictate the terms of data access. These terms are flexible and customizable, allowing the data owners to define access controls based on the needs of the data consumers.

Access Control Parameters. The system supports a wide range of parameters for access control, including but not limited to organization, groups, data classification, and data categorization. These parameters can be used individually or in combination to define detailed and context-specific data access policies.

Granular Permissions. The data contract system provides granular permissions, enabling specific access rights to different data consumers. This allows for the precise control of who can view, edit, delete, or distribute data, improving the overall security and privacy of data handled in the system.

Data Contract Enforcement. Once data contracts are established, the system platform ensures these contracts are strictly enforced. Any access to or interaction with the data is monitored and regulated based on the terms defined in the data contracts.

Contract Management. The system also includes features for efficient management of these contracts, such as the ability to create, edit, review, renew, or terminate data contracts as needed.

As a result of the above features, the system offers significant improvements in the granularity and flexibility of access control in data management systems, advancing beyond current solutions in the field.

Another aspect of the system platform is data domains, which refer to all data elements that pertain to a specific subject or topic area. The concept of data domains helps to create a more structured and organized approach to data management, resulting in improved data quality, security, and governance. In the context of the system platform, incorporating data domains has several implications, including the following.

Improved Search Relevancy. Data domains can be used to create filters or categories that enhance search functionality. When a user searches for information, The system can leverage data domains to refine and narrow down the search results, delivering more relevant content to the user.

Data Governance. Incorporating data domains into the system's active governance framework helps ensure that each data element is managed and governed according to its specific requirements. For example, a data domain associated with personal identifiable information (PII) will require stricter access controls and privacy measures compared to other types of data.

Data Integration. Data domains can help in integrating data from various sources by defining common standards and formats for each domain. This promotes consistency and reduces discrepancies in data from different sources, making it easier for the system to retrieve and present integrated data to the user.

Semantic Understanding. Data domains can help improve the semantic understanding of the system platform. By classifying data into specific domains, the platform can better understand the context of the data, which can enhance the accuracy of its large language models when generating content.

Security. By categorizing data into specific domains, the system can implement domain-specific security measures, ensuring that sensitive data domains have enhanced security controls.

Regulatory Compliance. Different data domains might need to comply with different regulations. By identifying these domains, the system can ensure each set of data complies with its specific regulatory requirements.

Incorporating data domains into the system design enhances the system platform's data management capabilities and makes it more efficient, secure, and user-friendly. In addition, it improves the platform's ability to retrieve, process, and present data while ensuring compliance with regulatory standards and improved data governance.

Incorporating large language models (LLMs) into the system platform can enhance the value and accessibility of governed search results, providing a multitude of applications. Each of these AI models have an extensive understanding of language, which they use to analyze, summarize, and generate new content based on the data they process. The system can apply these models to multiple use cases, for example, but limited to, the following.

Proposals. The system platform's language models can analyze and summarize the key points from a multitude of documents retrieved from a governed search. Using this summarized data, the models can generate detailed, accurate proposal content that adheres to specific requirements and targets, providing a solid foundation for proposal teams and helping to accelerate the proposal development process.

Compliance. In addition, the models can be used to generate compliance documents based on the data retrieved. They can search for specific regulatory guidelines or standards, then quickly and efficiently cross-reference these with a company's data and procedures to ensure alignment and compliance. The models can create a comprehensive compliance document that includes everything from a summary of the current state of compliance to areas that need improvement.

General Documentation. The system's large language models can also generate general-purpose documentation. For example, but not limited to, they can compile and summarize meeting notes, create project reports, or develop comprehensive user manuals based on the data they process. This not only saves time but also ensures that the generated documents are accurate, concise, and effectively meet the needs of the target audience.

By leveraging the power of large language models, the system transforms its robust, secure search platform into a dynamic tool that can generate high-quality content for a variety of business needs, saving time and resources while improving accuracy and consistency. The combination of active governance with these language models ensures that all data is processed in a secure and compliant manner, further enhancing the platform's value.

The use of persona-specific pre-built agents is another unique differentiator for the presently described subject matter of the system. These agents, which are tailored for various user personas, for example, but not limited to, proposal writers, compliance officers, and data analysts, and are designed to provide highly relevant and efficient search capabilities specific to the tasks and requirements of each role.

Proposal Writers. A proposal writer agent can be configured to understand the context of proposal requirements and provide search results that align with these needs. For example, the proposal writer agent can be configured to retrieve and summarize data relevant to the proposal topic, pull out past successful proposals, or generate new content based on the governed search results. This can help proposal writers streamline their work and create effective, data-driven proposals.

Compliance Officers. A compliance officer agent can be configured to prioritize data relevant to regulatory requirements and guidelines. For example, the compliance officer agent can be configured to provide search results highlighting areas of compliance and non-compliance, generate up-to-date compliance reports, or identify potential risks and remediation strategies. This can make it easier for compliance officers to maintain the organization's regulatory standing and address any compliance issues proactively.

Data Analysts. A data analyst agent can be configured to deliver insights from the stored data effectively. For example, the compliance officer agent can be configured to identify and present key trends, patterns, or anomalies in the data, offering predictive analytics, or providing the raw data for further analysis. This allows data analysts to focus on high-value analytical tasks, leading to faster, more accurate decision-making.

These pre-built agents can leverage the system's active governance framework, data domain design, and large language model capabilities to deliver quickly and efficiently personalized, relevant, and secure search results. This tailored approach enhances the user experience, improves productivity, and provides each user with the specific data and insights they need to perform their roles effectively. As a result, the system provides efficiencies in both computer and human resource use, response times, and efficiencies by being configured to respond to the diverse data needs across different roles within an organization.

Records management is also an important part of the system and involves maintaining, controlling, and eventually disposing of records in a systematic, efficient, and compliant way. The inclusion of a records management capability further enhances the system's active governance framework by providing additional control over the lifecycle of data. Specifically, the records management capability in the system can allow users to perform the following actions.

Categorize and Organize Data. This action can involve defining and applying records schedules or classifications to data at the time of its creation or receipt. This allows for a more efficient retrieval process and ensures that the data is handled according to its defined lifecycle.

Preserve Data. This action can include activities to ensure the long-term preservation and authenticity of records. This might involve maintaining the integrity of data, backing up data, and protecting the data from unauthorized access or alteration.

Dispose of Data. This action can include identifying when records are no longer needed for operational purposes and can be destroyed or archived. The ability to apply records schedules allows users to automatically identify when data reaches its end of life and safely remove it from active storage.

Regulatory Compliance. This action can include defining and enforcing records schedules, and the system can ensure that the stored data complies with legal and regulatory obligations. This can include maintaining certain types of data for a defined period, disposing of other types of data in a compliant way, or handling data according to specific regulations, for example, but not limited to, GDPR, CCPA, and Health Insurance Portability and Accountability Act (HIPAA).

Audit Trails. This action can include maintaining an audit trail of all record actions, the system can allow users to track the lifecycle of records and demonstrate compliance with regulatory requirements. This can be critical for managing data breaches, litigation, and regulatory audits.

Security. This action can enhance data security by applying different record management and security controls to different types of data. For example, sensitive or confidential records can be classified in a way that applies stricter access controls or more robust encryption.

By incorporating records management into its design, the system ensures that data is not only secure and accurate but is also managed in accordance with its lifecycle, from creation to eventual disposal. This aligns with the principles of active governance and enhances the platform's value proposition in terms of data integrity, security, and compliance.

In addition, the incorporation of role-based access and data masking security capabilities within the system adds another layer of security to the platform. By adhering to industry security best practices, the system ensures that data is secure, compliant, and accessible only to authorized users.

Role-Based Access Control (RBAC). With RBAC, the system can grant access to specific data based on the roles assigned to individual users within an organization. This ensures that only authorized users can access specific data based on their responsibilities and privileges, which significantly reduces the risk of unauthorized data access.

Data Ownership Control. The system can allow data owners to control who has access to their data. This not only provides a level of control and assurance to data owners but further helps maintain the integrity and security of the data.

Data Contracts. By using data contracts, the system can enforce the agreed terms and conditions for data access, usage, and sharing. This provides a clear understanding of the data governance policies and ensures all users adhere to them.

Data Masking. The system can mask sensitive data to prevent exposure while still allowing the data to be used for operational or analytical processes. This is particularly important for protecting personal identifiable information (PII) and other sensitive data.

In addition, the system incorporates a number of the industry security best practices including, but not limited to: 1) implement a least privilege principle, which ensures that users are given only the minimum levels of access necessary to perform their jobs to reduce the risk of unauthorized access or data leaks; 2) conduct regular security audits to identify any potential vulnerabilities or breaches to help maintain the integrity of the system and ensure continuous compliance with security standards; 3) encrypting data at rest and in transit to protect sensitive information from unauthorized access, which is particularly important for data stored in the cloud or transferred over the internet; 4) us multi-factor authentication (MFA) to verify the identity of users before granting access to the system, which adds an extra layer of security and significantly reduces the risk of unauthorized access; 5) provide regular security training to all users to understand the importance of data security, identify potential threats, and adhere to security practices; and 6) prepare and implement a well-defined incident response plan to quickly and effectively address any security breaches, which helps minimize the impact of any security incidents and ensures a quick recovery.

By following these best practices in conjunction with the above-discussed advanced security features like role-based access control, data contracts, and data masking, the system provides a highly secure and compliant data management platform.

As data continues to grow in volume and complexity, efficient data search and retrieval becomes essential for businesses. Unfortunately, current solutions, which can mostly depend on generic Python libraries, often do not meet the specific needs of advanced data search platforms. As a result, a custom solution tailored to address these unique challenges is needed. In response to this need a customized Python library has been developed and which has been designed to optimize the creation and functioning of the data search system platform. The unique design and architecture of the library ensure improved customization, efficiency, performance, ease of maintenance and upgrades, better integration and compatibility, and superior security. Specifically, the library allows better control over licensing and costs, thereby making it a more cost-effective solution. This has been accomplished by building a customized library using, for example, in this embodiment, a Python library with the specific needs of the system in mind, which allows for the development of unique features, algorithms, and structures that are ideally suited for the platform's requirements. In addition, the library includes only the necessary functions and components, which optimizes its performance. The lean structure results in faster execution times and lower memory consumption. Because it is a proprietary solution, the system library can be easily updated and maintained. This includes the ability to quickly fix bugs, add new features, and adapt to changes in platform requirements. Further, the library has been designed to integrate seamlessly with the system's other components and to be compatible with specific systems or technologies used in the platform, which ensures a smooth, uninterrupted user experience. Still further, the library can implement customized security measures and controls, which offers users enhanced protection against data breaches or cyber threats compared to reliance on third-party libraries. Finally, as a proprietary library, it is not bound by third-party licensing restrictions and costs, which provides more freedom and potential cost savings over time.

FIG. 1 is a chart illustrating some of the major sources and magnitude of the data explosion being experienced by businesses. In FIG. 1, a system 100 that tackles the significant challenges presented by the data explosion phenomenon 105 where businesses are overwhelmed with vast amounts of information, and that businesses need to control and harness this data to gain a competitive advantage 115 over their competitors. FIG. 1 shows another source of the data explosion being due to the dynamic nature of the changing workforce 105, which requires companies to optimize their understanding, i.e., comprehension, 120 of this date to be able to leverage these changes to gain a competitive edge. One real world example of this data explosion and comprehension issue 110 is shown in an article regarding how lawyers are having issues using generative AI and how it is creating potential ethical issues. To optimize data comprehension and effectively manage the data deluge, embodiments of the system offer innovative solutions, including emphasizing the importance of maintaining governance, privacy, and data integrity 130 in the face of increasing data volumes. With embodiments of the system 100, businesses can overcome these challenges and capitalize on the opportunities presented by the data explosion, ensuring their sustained success in this evolving business data landscape.

Figure 2:
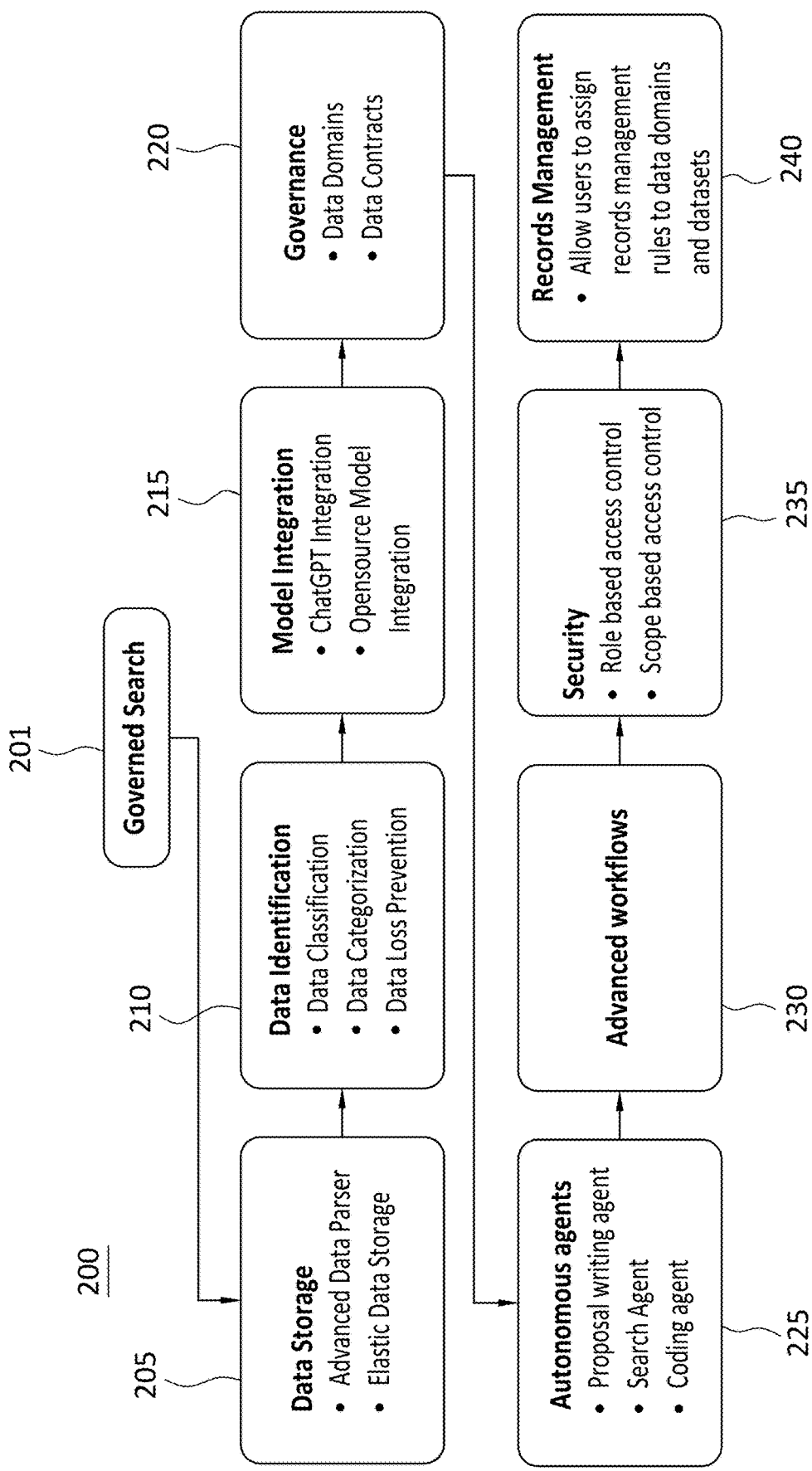
FIG. 2 is a detailed organizational structure chart illustrating the functional components or subsections and process flow of a governed search system that uses generative artificial intelligence (AI) and large language learning models (LLMs), in accordance with the disclosed subject matter.

FIG. 2 is a detailed organizational structure chart illustrating the functional components or subsections and process flow of a governed search system 200 that uses generative artificial intelligence (AI) and large language learning models (LLMs), in accordance with the disclosed subject matter. The governed search system 200 includes various interrelated components or subsections, each playing a vital role in the functionality of the governed search system 200. Each component or subsection can be implemented as hardware, firmware, software, as well as any combination thereof. In FIG. 2, the governed search system 200 includes a data storage subsection 205 that incorporates and is configured to provide advanced data parsing and elastic data storage mechanisms for all received data. The data storage segment 205 is further configured to enable efficient handling and storage of extensive datasets within the received data and is communicatively connected to a data identification subsection 210. The data identification subsection 210 is configured to perform data management functions on the received data, including data classification, data categorization, and data loss prevention measures, thereby ensuring effective data organization and protection. The data identification subsection 210 is in turn communicatively connected to a model integration subsection 215 that is configured to seamlessly integrate various AI models, including chat GPT and a variety of open-source models to provide the governed search system 200 with the versatility to select from and leverage multiple AI system capabilities when accessing and processing the received data. The model integration subsection 215 is communicatively connected to a governance subsection 220 that is configured to outline data domains and data contracts and define rules and regulations that govern data usage and handling, thereby fostering responsible data governance within the governed search system 200. The governance subsection 220 is communicatively connected to an autonomous agent's subsection 225, which can include a proposal writing agent 226, a search agent 227, and a coding agent 228. Each of these agents can perform specific tasks independently of each other, thus enhancing overall system efficiency. The autonomous agent's subsection 225 is communicatively connected to an advanced workflows subsection 230 that is configured to streamline data processing, which still further optimizes productivity of the governed search system 200. The advanced workflows subsection 230 is communicatively connected to a security subsection 235, which is configured to implement security measures through the implementation of role-based access control and scope-based access control mechanisms, ensuring data security and restricted access based on user roles and data domains. The security subsection 235 is communicatively connected to a records management subsection 240 that is configured to permit users to assign records management rules to data domains and datasets, thus facilitating organized data management and adherence to records management protocols. This holistic approach underscores the governed search system's 200 capabilities, which effectively utilizes AI technologies to maximize data search, understanding, governance, and management while ensuring reliable, secure, and responsible data utilization.

Figure 3:
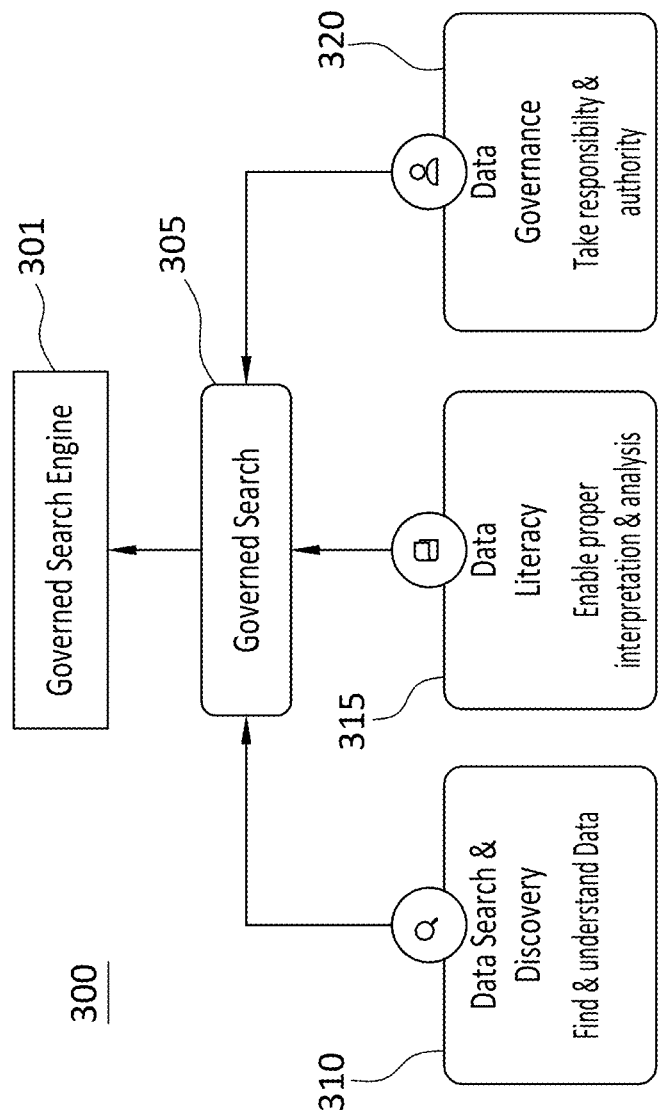
FIG. 3 is a functional diagram of the governed search system of FIG. 2 utilizing generative AI and LLMs, in accordance with one or more embodiments of the disclosed subject matter.

FIG. 3 is a functional diagram of a governed search system 300 utilizing generative artificial intelligence (AI) and large language learning models (LLMs), in accordance with one or more embodiments of the disclosed subject matter. In FIG. 3, the governed search system 300 includes a governed search engine 301 in which a governed search system 305 is implemented and that includes three crucial interconnected components. A first component, a data search & discovery component 310 utilizes AI algorithms to efficiently retrieve relevant data based on user queries and keywords, enabling users to access comprehensive insights into the relevant data. A second component, a data literacy component 315 employs natural language processing and generative AI to interpret complex data, to present it in a user-friendly format, empowering users to analyze and comprehend information effectively. A third component, a data governance component 320, incorporating robust policies for secure and ethical data handling, ensuring compliance with regulations and fostering trust. This integrated approach optimizes data-driven decision-making processes while maintaining responsible data utilization, revolutionizing the way users interact with and derive value from vast datasets.

Figure 4:
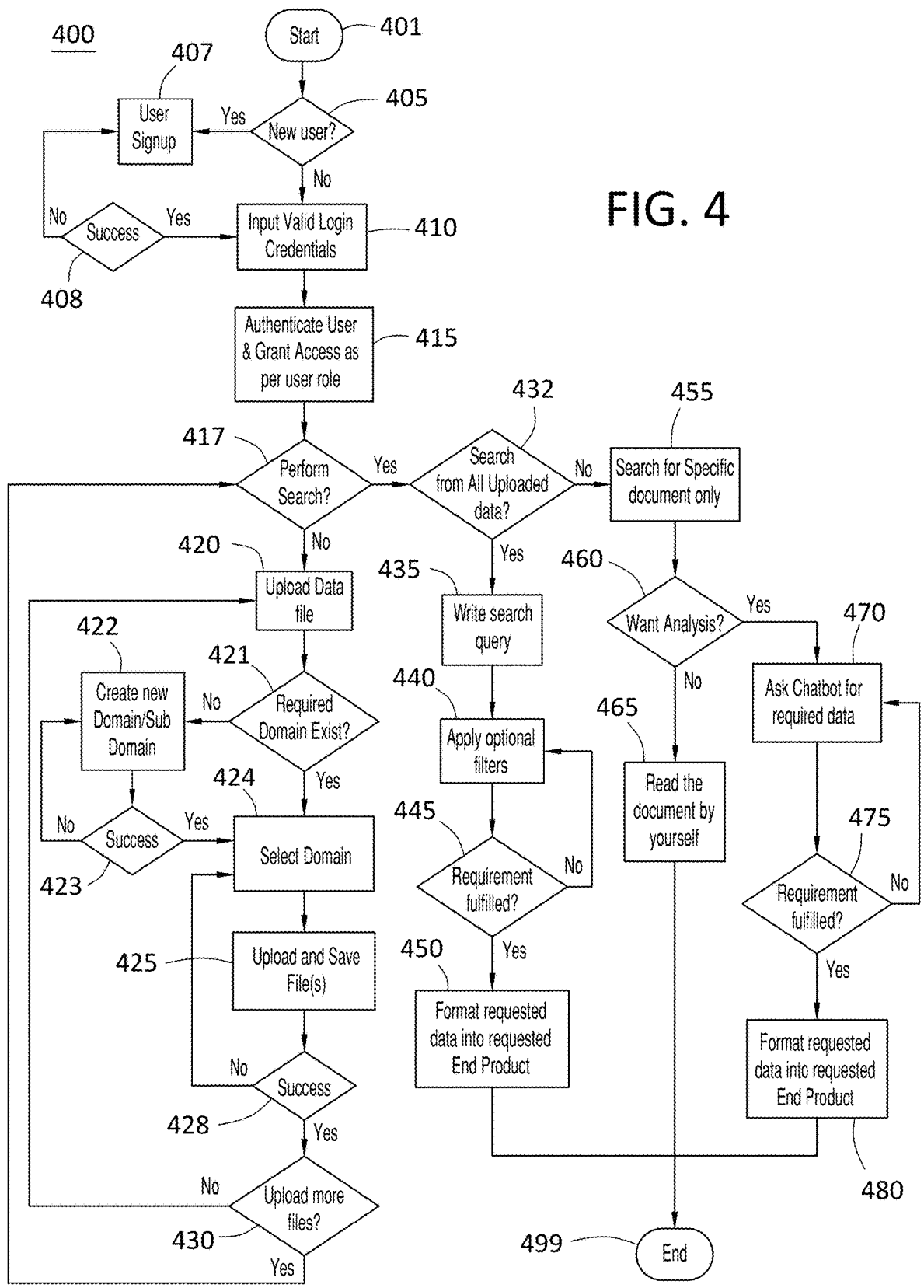
FIG. 4 is an operational flow chart of a user-centric governed search system, in accordance with one or more embodiments of the disclosed subject matter.

FIG. 4 is a functional diagram showing the functional elements and workflow of a system for providing governed search capabilities using generative artificial intelligence (AI) and large language learning models (LLMs), in accordance with one or more embodiments of the disclosed subject matter. In general, an active governance system 400 can include various processes, operations, and activities such as data quality control, data integration, data security, data privacy, and regulatory compliance. These processes and activities help users and organizations to understand the data that they have, where it comes from, where it goes, and how it changes over time. Active governance further ensures that data is accurate, consistent, and usable. It allows organizations to control data flow, manage data risk, and improve data value. In FIG. 4, the flow of operations in a user-centric system starts 401 and determines 405 whether the user is a new user or an existing user. If the user is determined 405 to be new, then a user signup/login process 407 is started to enable users to register to use the system and be assigned their specific credentials, which includes their access rights to save, search, and delete information in the in the governed search system 200. If the registration process is not a success 408, the process loops back to the user signup/login process 407 to acquire the missing or inaccurate information. If the registration process is a success 408, or the user is a registered user, the process continues to a screen for the user to enter 410 their valid login information, i.e., credentials. The process then attempts to authenticate 415 the user using the entered login information, and, if the user login information is authenticated 415, the user is granted access to the governed search system 200 based on their assigned access rights. Once logged in, the process continues and the user determines 417 whether they want to perform a search or upload a file or files. Although not shown, if the user login information cannot be authenticated 415, the user is not granted access and the process loops back to have the user reenter 410 their valid user login information. In some embodiments, although also not shown, after a predetermined number of failed user login attempts, for example, but not limited to, three, the system can be locked to prevent any additional attempts by the user to try to login to ensure system safety and integrity and a system administrator will need to reset the user's rights.

In FIG. 4, if it is determined 417 that the user wants to upload a file or files, the user then can start to upload 420 their file or files by determining 421 whether a desired domain exists in the governed search system 200. If it is determined 421 that the desired domain does not exist, the process permits the user to create 422 a new domain, which can include a subdomain under an existing domain. If the new domain was not successfully created 422, then the process loops back to the create 422 a new domain, so the user can try to create the new domain again. Once the new domain is successfully created 422, or if the domain already existed, the process permits the user to select 424 the domain into which the file is to be uploaded and then attempts to save 425 the file in the governed search system 200. If the process determines 428 that the file was not successfully saved, the process loops back to the select 424 domain step for the user to reselect 424 a domain and then continues as before. If the process determines 428 that the file was successfully saved, the process continues to determine 430 whether there are more files to upload. The details of an embodiment of the file upload 420 process are described below in relation to FIG. 6.

Figure 5:
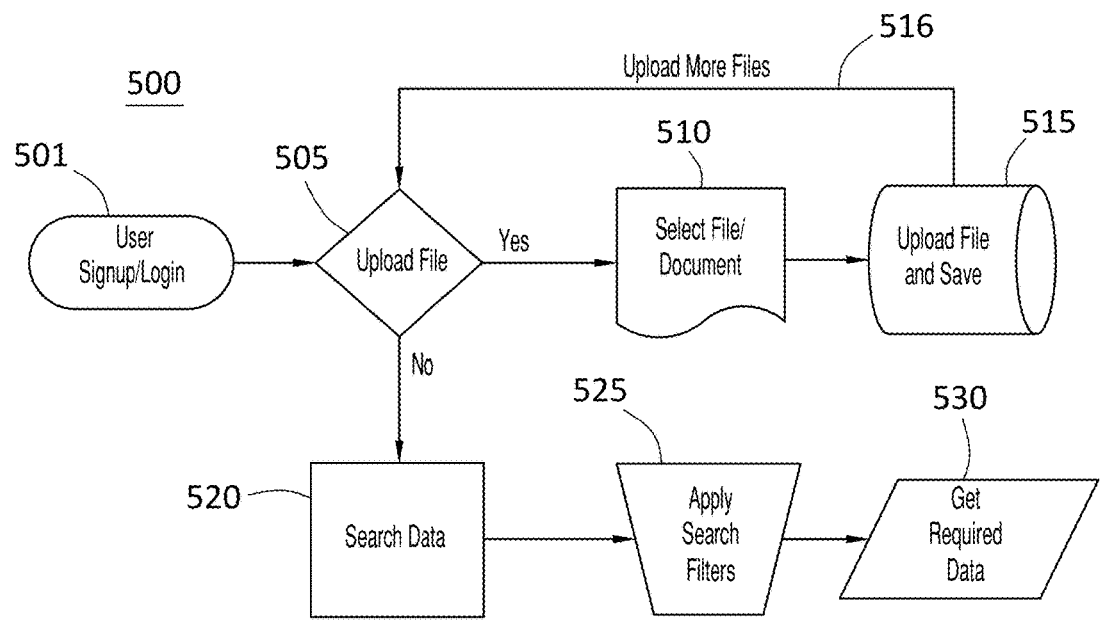
FIG. 5 illustrates a system flow chart of operations within a search engine platform in the governed search system, in accordance with one or more embodiments of the disclosed subject matter.

In FIG. 5, if the process determines 430 the user has additional files to upload, the process loops back to permit the user to upload 420 the additional file or files. If it is determined 430 that there are no more files to upload, then the process continues and loops back to determine 417 whether the user wants to perform a search. If it is determined 417 that the user wants to perform a search, the process continues and determines 432 whether to search from all of the uploaded data in the system 200 or, in other words, from all domains and, if it is determined 432 the user wants to search all of the uploaded data, the process permits the user to enter 435 search parameters for requested data in a search, which, optionally, can include search filters. If entered, the process will apply 440 the search filters to the entered 435 search parameters to search for the desired data and then determine 445 445 whether the requested data was obtained. A more detailed description of an embodiment of the search process (435, 440, and 445) is provided below in relation to FIG. 7. If the process determines 445 that the requested data was not obtained, the process loops back to try to again apply 440 the search filters to the entered 435 search parameters to search for the desired data. In embodiments, although not explicitly shown in FIG. 6, if after a predetermined number of attempts to apply 440 the search filters to the entered 435 search parameters, the process still determines 445 that the requested data was not obtained, the process can loop back to permit the user to write 435 a new search query. If the process determines 445 that the requested data was obtained, the process can then format 450 the requested/obtained data into a requested end-product format for the user to use. Although not shown for clarity, the process can then loop back to either upload 420 files or enter 435 new search parameters for additional data or, if the user is done, the process can end 499.

In FIG. 4, if it is determined 432 the user only wants to search for a specific document in the uploaded data, the process permits the user to enter 455 search parameters for requested data in a specific document, which, optionally, can include search filters. The process continues and determines 460 whether the user wants analysis of the requested document and, if yes, the process requests 470 the data through a commercial generative AI chatbot program such as, for example, but not limited to, ChatGPT, which is also referred to as an AI natural language processing tool. If the process determines 475 that the requested data was obtained, the process can then format 480 the requested/obtained data into a requested end-product format for the user to use. Although not shown for clarity, the process can then loop back to either upload 420 more files or enter 435 new search parameters for additional data or, if the user is done, the process can end 499. If the process determines 460 the user does not want any analysis of the requested document, the process provides 465 the document directly to the user for the user to review. Although not shown for clarity, the process can then loop back to either upload 420 more files or enter 435 new search parameters for additional data or, if the user is done, the process can end 499.

FIG. 5 is a system flow diagram illustrating the process flows for seamless user interactions in the governed search system 200, in accordance with one or more embodiments of the disclosed subject matter. In FIG. 5, the flow 500 commences with a user signup/login process 501, where new users have can sign up, that is, register, for a new account or existing users can sign in to access the governed search system 200 using their previously assigned credentials. New users can provide their essential data to create a new account including, for example, but not limited to, a username, an email, and a password. During this registration process, additional verification measures, like email confirmation or CAPTCHA, can be incorporated to enhance security. Upon successful entry of the new user information, the system securely stores the user's registration information, which can include, but are not limited to, an assigned role (e.g., user, guest, manager, administrator), permissions (e.g., read, edit, create, write, delete), and access rights (e.g., personal domain, group domain, all domains), in the governed search system 200 database. Alternatively, existing users can sign in 501 and undergo a user authentication process, where they must enter their credentials (for example, username and password) to verify their identity. The system then cross-references this data against the stored user records to validate the user's authenticity. Upon successful authentication, users are granted access to the platform based on their assigned roles and permissions, which are previously configured by administrators. This strict access control ensures that users can utilize the platform's functionalities precisely in line with their authorized privileges, safeguarding sensitive information and promoting data integrity. Depending on their roles, users may have varying levels of access to search, view, create, edit, or delete data. This granular access control also enables administrators to manage user permissions efficiently. Additionally, the platform may implement additional security measures including, but not limited to, two-factor authentication (2FA) or single sign-on (SSO) to further enhance user data protection. By maintaining appropriate access levels and incorporating robust security measures, the system ensures a seamless and secure user experience, fostering user confidence and trust. Ultimately, this controlled flow of operations within the search engine platform facilitates efficient and reliable information retrieval while upholding the highest standards of security and privacy.

Figure 6:
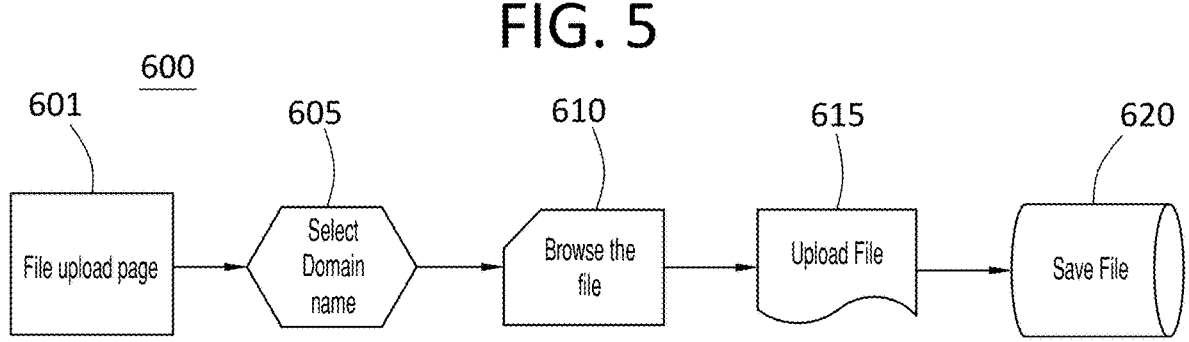
FIG. 6 illustrates a flow chart of operations in a file upload process in the governed search system, in accordance with one or more embodiments of the disclosed subject matter.

In FIG. 5, upon successful authentication, the user can proceed to the main functionalities, where the flow determines 505 whether to follow an upload 505 file path or a search 520 data path. If it is determined 505 that the user chooses to upload a file, they are prompted to select 510 a document or file from, for example, but not limited to, their local storage, computer desktop, or a cloud storage system. Upon selection 510 of the file, the user can upload and save 515 the selected 510 file, which is saved securely in a domain within the governed search system 200 that the user is authorized to use. Additionally, the user can opt to upload 516 more files, and the process 500 loops back to enable the user to determine 505 whether to upload additional files, which ensures efficient handling and storage of multiple uploaded files or, alternatively, to search 520 the uploaded files. Although not shown, if it is determined 505 that the user does not want to upload any additional files, or continue using the governed search system 200, they can log off and the process ends. If it is determined 505 that the user elects not to upload a file, but instead wants to search the stored data, they can input their search criteria, i.e., queries and keywords, into a search bar (as seen in FIG. 8). In FIG. 6, the flow 500 then performs a search 520 operation in the data stored in the governed search system 200 based on the provided criteria to retrieve the required data. Within the platform, the domains feature stands as a vital tool in facilitating organized document management. Users can generate distinct domains while uploading documents, thus fostering a structured environment. As the search functionality comes into play, this attribute gains even more significance, because users possess the ability to selectively choose domains during their searches of the system 200, thereby intricately honing down their search results. This strategic approach culminates in a refined and more pertinent set of answers, bolstered by the capability to apply 525 a diverse array of over 500 specialized search filters. These filters can range from topics to evaluation years and beyond and can aid in furnishing a comprehensive and tailored search experience that is configured to accommodate an array of different user preferences. The governed search system 200 ensures that users obtain the relevant data they need, promoting an effective and streamlined information retrieval process.

Figure 9:
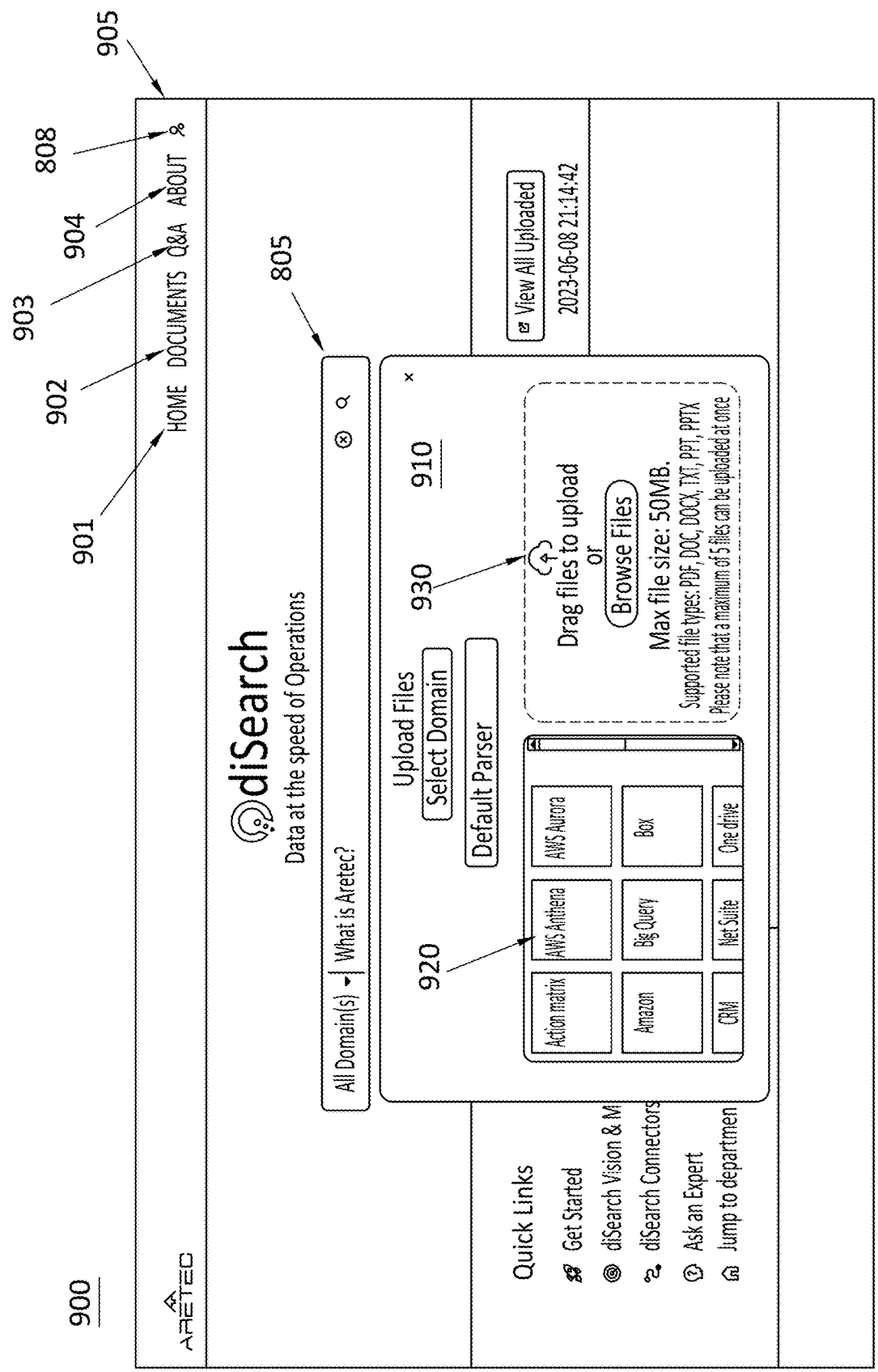
FIG. 9 is a screenshot of the main screen in the governed search system in FIG. 8 after a user has selected a file upload function shown with a navigation bar, in accordance with one or more embodiments of the disclosed subject matter.

FIG. 6 illustrates a step-by-step flow of operations in a file upload process 600 in the governed search system, in accordance with one or more embodiments of the disclosed subject matter. In FIG. 6, the file upload process 600, begins on a designated file upload page 601 (as best shown in FIG. 9), where users initiate the file upload process 600. The user then selects 605 a domain for the file being uploaded. In this step, the user can assign each document to a specific domain and/or a subdomain, based on the document's content and with correspondence to specific subjects or themes that can be predefined in the system or created by the user based on the content of the document being uploaded. Next, users can browse 610 and retrieve the file from, for example, but not limited to, their local storage, their computer desktop, or a cloud storage system and select the desired file to upload. Once the file is chosen, the system proceeds to upload 615 the file, and securely save 620 the selected file into the selected 605 domain in the governed search system 200 database, to ensure data integrity. This flow 600 streamlines the file upload process, offering users a seamless and systematic approach to categorize, select, and securely upload their files within the system, which promotes effective data management and organization.

Figure 7:
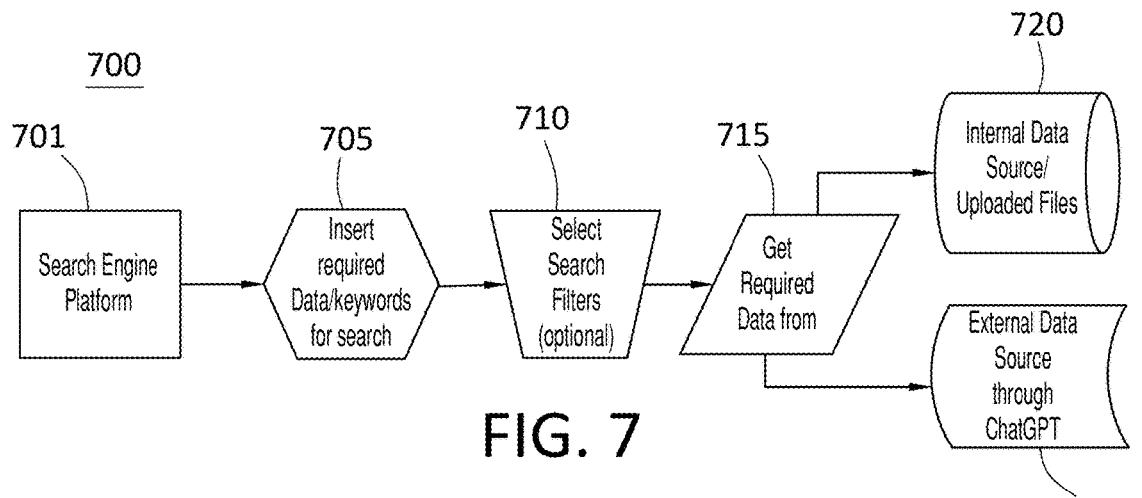
FIG. 7 illustrates an operational flow chart of a search process flow within the search engine platform in the governed search system, in accordance with one or more embodiments of the disclosed subject matter.

FIG. 7 illustrates the operational search process flow within a search engine platform in the governed search system, in accordance with one or more embodiments of the disclosed subject matter. In FIG. 7, a search process flow diagram 700 illustrates a systematic approach to information retrieval in the governed search system 200. The flow commences with a user accessing 701 the governed search system 200 by logging into the governed search system 200 after which the user can input 705 the desired data or keywords to initiate the search process. For an enhanced search experience, users can optionally select 710 specific search filters to further define the search parameters. This feature enables users to fine-tune search outcomes to a remarkable degree of precision. Notably, by employing the "domain" filter, users can channel their search queries into designated domains or subdomains, thereby attaining swifter and more targeted and relevant results. This deliberate approach transforms the search function into a robust tool, allowing users to swiftly uncover information buried within particular thematic landscapes. Beyond the "domain" filter, an expansive array of similar search filters can be used, extending from topics to dates and beyond, which aids in the governed search system's 200 ability to furnish a highly tailored and efficient search environment. The process 700 then proceeds to retrieve 715 the requested data from two distinct sources. Firstly, the process can access 720 an internal data source and the prior uploaded files using the entered parameters and filters, where it can efficiently fetch relevant information stored within the governed search system 200 database. Secondly, the platform can access 725 external data sources using a large language model-based chatbot, for example, but not limited to, Chat GPT, utilizing advanced generative AI capabilities to gain additional insights and information from information available on external data sources, for example, but not limited to, the Internet. This collaborative approach ensures comprehensive and accurate data retrieval, enabling users to make informed decisions based on the obtained results, while streamlining the search process for a seamless and efficient user experience.

Figure 8A:
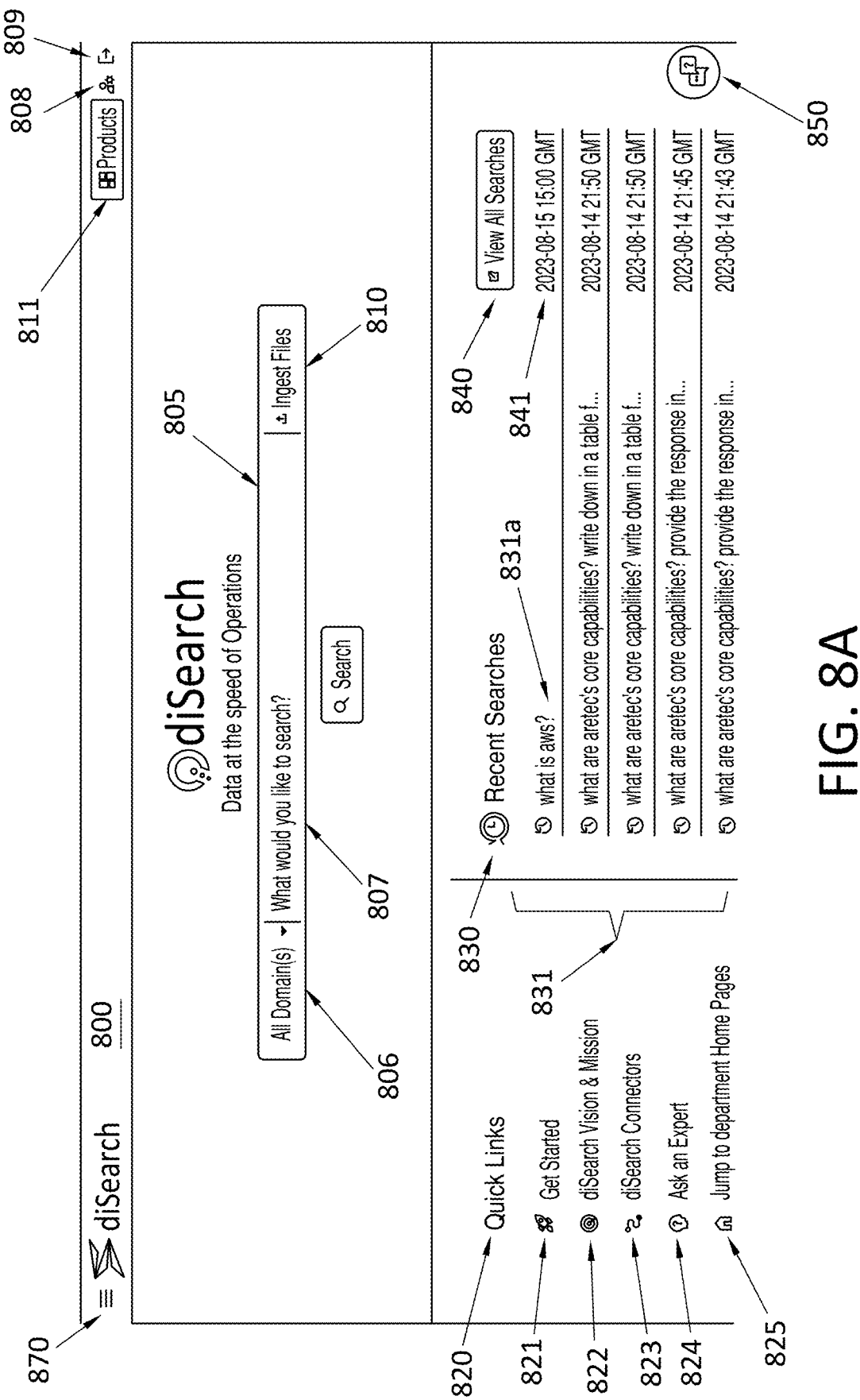
FIG. 8A is a screenshot of a main screen in the governed search system from which a user can upload files or search for data from all or a selected number of information domains, in accordance with one or more embodiments of the disclosed subject matter.

FIG. 8A is a screenshot of a main screen 800 in the governed search system from which a user can upload files or search for data from all or selected number of information domains, in accordance with one or more embodiments of the disclosed subject matter. In FIG. 8A, a quick links section 820 includes a number of links designed to enhance user engagement and facilitate intuitive navigation of the system. Among these links is a "Get Started" link 821, which links to comprehensive information describing the system's operational intricacies. Also included is a "System Vision and Mission" link 822 that connects the user to an explanation of the underlying rationale behind the system's creation, including a holistic view of its intended purpose and overarching mission. The quick links section 820 also includes a "Search Connectors" link 823 that connects users to a list of the various Boolean search connectors available for crafting nuanced search strings, including, but not limited to, operators such as AND, OR, XOR, and NOT. Yet another link is an "Ask an Expert" link 824, which provides a connection for users to interact with seasoned system users via a chat feature to seek guidance and assistance directly from users well-versed in system operations. Finally, a "Jump to Department Home Pages" link 825, which, when selected, guides users to their respective internal company department home page(s) to provide rapid access to custom-tailored resources, insights, and updates that are closely aligned with the specific requirements of their designated departments. For example, this can include having a smaller more focused set of domains 806 that are provided as the user's first choices in the system, but that can be overridden by the user to permit broader search resources.

In FIG. 8A, the main screen 800 also includes a search request entry box 805 that includes a domain selection section 806 and a search parameter entry section 807. The domain selection section 806 is configured as a pull-down menu, which, when selected can display the data domains that are available for selection by the specific user and which is better illustrated in FIG. 10. The search parameter entry section 807 is configured to receive natural language and Boolean search parameters either with or without format requests for the output information by the user and which is also shown in FIG. 11. For example, the format requests for the output information can specify whether the information is to be provided in a list, a table, a paragraph form, or as individual sentences. The main screen 800 also includes an upload files button 810, which is part of the search request entry box 805, and that, when selected by the user, is configured to open an upload file screen, which is better illustrated in FIG. 9. In FIG. 8A, an actions menu option 808 is configured to connect users to the platform's operational parameters, which is better illustrated and described in relation to FIG. 17. A logout button 809, which, upon selection, completely terminates the user's session and ensures their privacy and security. The result is a return to a login screen, where the user can re-login to the system by providing their credentials.

In FIG. 8A, a "Recent Searches" section 830, includes a scrollable listing 831 of the most recent search requests that the user has entered into the system. The time period for which search requests are shown in the scrollable listing 831 can be selected by the user or, if not selected, uses a predetermined system default time. In this list a first search request 831a for "what is aws?" is shown with its precise upload date and time 841. In FIG. 8A, a menu tab 870 is included to permit the user to access the available menu options, which are best seen and described below in relation to FIG. 8B. Further, a "Products" icon 811 is also provided and when selected opens a listing of available products within the system, including, for example, but not limited to, different report type formats for the responses, different workflows customized for use cases such as compliance or proposal development workflows. An actions icon 808 is also included and when selected opens a listing of available action items that the user can access to control the various settings and features of the system, including, for example, but not limited to, system settings, an access management page, a domain configuration page and an AI configuration page. Finally, a help/chat icon 850 is provided and when selected opens a help/chat function within the system, including, for example, but not limited to, an electronic help system that the user can access and ask questions about all aspects of the system, a chat box into which the user can send queries to a live or virtual AI assistant or other users, and retrieve any frequently asked questions.

Figure 8B:
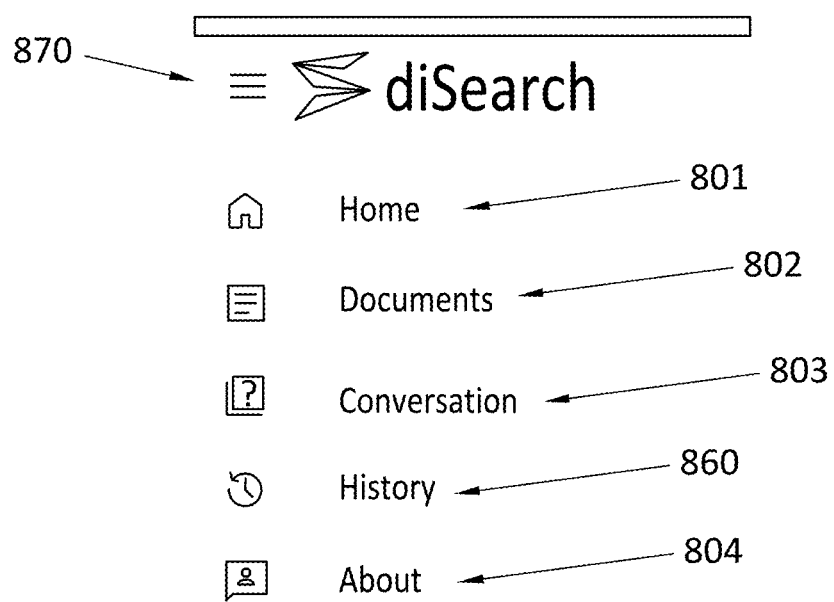
FIG. 8B is a screenshot of a pull-down menu main screen in the governed search system from which a user can upload files or search for data from all or a selected number of information domains, in accordance with one or more embodiments of the disclosed subject matter.

FIG. 8B is a screenshot of the menu tab 870 options after the user has opened it, in accordance with one or more embodiments of the disclosed subject matter. In FIG. 8B, the menu tab 870 options are shown and include a home menu option 801, a documents option 802, a conversation or Q&A option 803, a history option 860, and an about option 804. When selected, the home menu option 801 returns the user to the search/upload screen 800. The documents option 802 permits the user to access the documents section of the system 200 and the documents to which the user is authorized to access. The information provided can include, but is not limited to, file names, current status, affiliated domains, creation dates, a 'delete' button, and an expansion feature, which provides the user with access to information specific to each document including, but not limited to, when the document was uploaded, its subsequent stages of parsing, and processing images, and more. Precise metrics such as the number of processed tables, text segments, and images, provide users with a detailed understanding of each document's processing status. The conversation or Q&A menu option 803 is used to open a question-and-answer page for the user to ask questions about the data in the system. The history option 860 is used to access information about the history of the system 200 including, but not limited to, all historic searches executed by the user, documents retrieved as part of the search and open domain results for the search. The about menu option 804 is used by users to access a comprehensive overview of the system 200, ranging from its origins and purpose to its core functionalities and broader significance such as the platform's mission, scope, and ongoing evolution. The actions menu option 808 is used to connect to a comprehensive range of user-centric functionalities. Upon activation, this dynamic feature, best visualized in FIG. 17, opens a menu to enable users to control their experience in the system 200. This control can include, but is not limited to, enabling users to navigate, and set their user-specific settings, review data domains, oversee member interactions, and manage billing specifics. Through this option, users are able to fine-tune the system's behavior to ensure it aligns with their preferences.

FIG. 9 is a screenshot of a main screen 900 in the governed search system in FIG. 8 is shown with a navigation bar 905 after the user has selected a file upload function, in accordance with one or more embodiments of the disclosed subject matter. In FIG. 9, after the user has selected the upload files button 810, an upload files window 910 opens and includes a scrollable listing of available source domains 920 from which the user can select to permit the user to then select a file or files that is/are to be uploaded. As seen in FIG. 9, these domains can include both internal and external data sources. The desired files can either be dragged from a selected source domain into the files upload section 930 or the files located in the selected source domain can be browsed and selected from a list of the files in the selected source domain. In general, the files are in one of several formats, which, in the embodiment disclosed, can include, but are not limited to, a portable document format (pdf), an old word processing file format (doc), a new Office Open XML-based word processing file format (docx), a text only file format (txt), an old presentation file format (ppt) for Powerpoint® from Microsoft Corporation, and a new presentation file format (pptx) for Powerpoint® from Microsoft Corporation. Also, in the disclosed embodiment of FIG. 9, up to five files can be uploaded together, but other embodiments are contemplated in which more than five files can be uploaded. In FIG. 9, a navigation bar 905 includes a home menu option 901, which, when selected, will return the user to the main screen 900. Also included in the main screen 900 is a documents menu option 902, which, when selected, displays a list of the documents available to and enables the user to directly access the documents stored within the system 200. The list of the documents includes file names, current status, affiliated domains, creation dates, and an essential 'delete' button. For further insights, an expansion feature is included and provides access to historical aspects of a document's processing and inclusion in the system, from its initial "Uploaded" status to subsequent stages of "Parsing," "Processing Images," and more. In addition, precise metrics such as the number of processed tables, text segments, and images, provide users with a detailed understanding of each document's processing status. Further, a Q&A menu option 903, when selected, is configured to open a question-and-answer page for the user to ask questions about the system. Still further, an about menu option 904, when selected, provides comprehensive insights into the system, including its origins and purpose, its core functionalities, and broader significance to provide the user with a complete understanding of the platform's mission, scope, and ongoing evolution.

Figure 10:
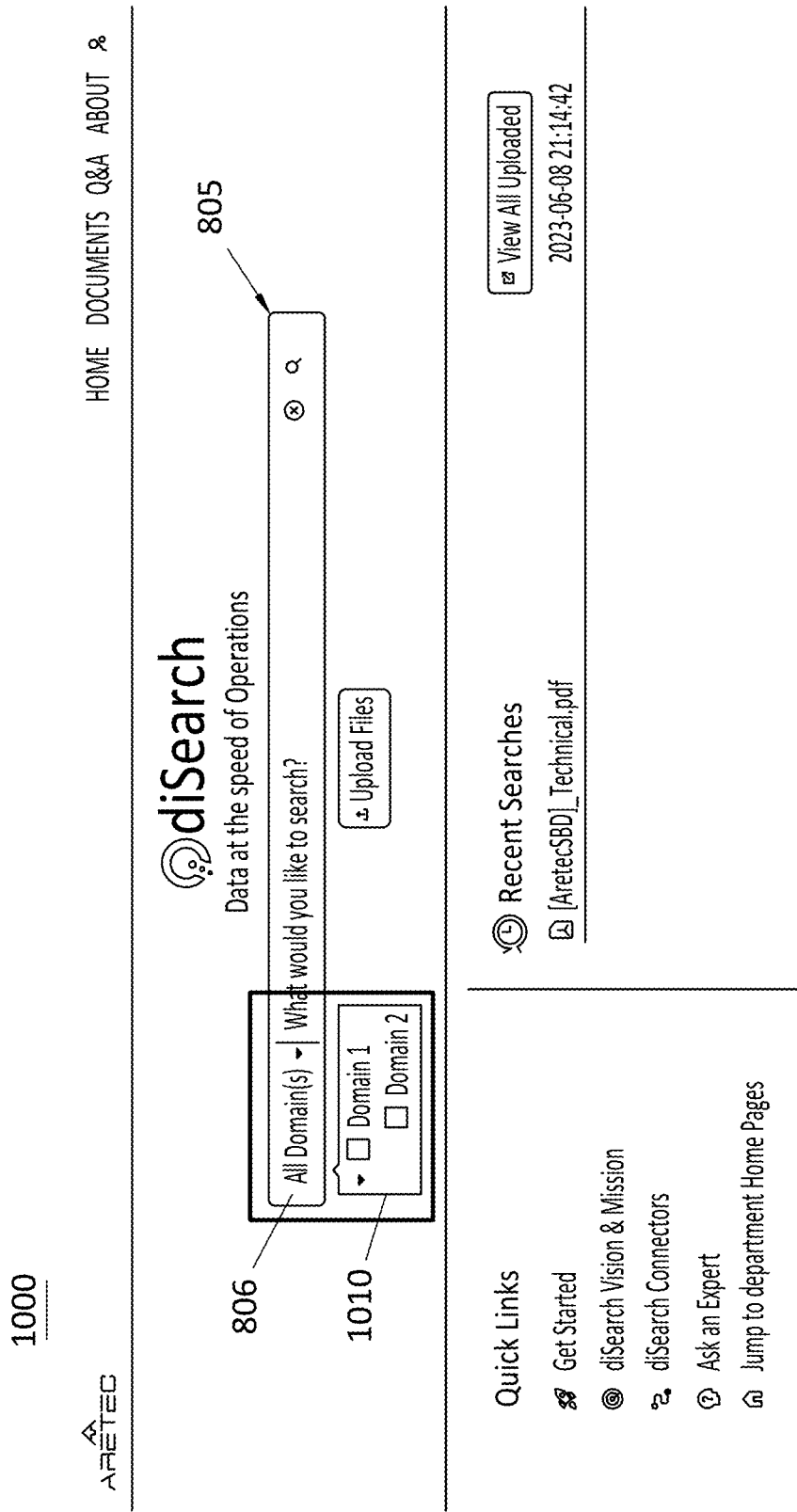
FIG. 10 is a screenshot of the main screen in the governed search system in FIG. 8 showing a pull-down menu of available information domains, in accordance with one or more embodiments of the disclosed subject matter.
Figure 11:
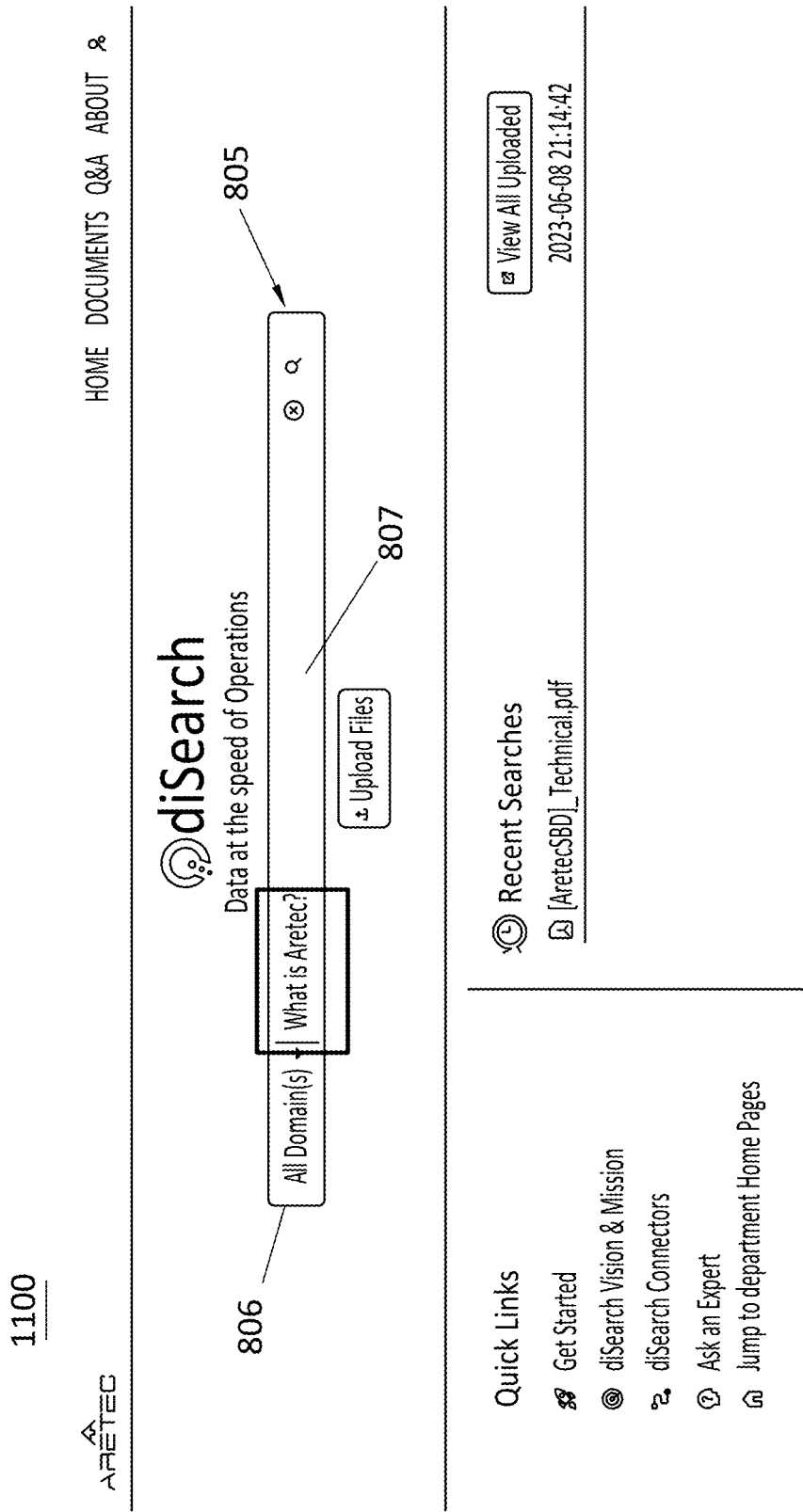
FIG. 11 is a screenshot of the main screen in the governed search system in FIG. 8 and FIG. 10 after a user has selected All Domains and entered an initial set of search parameters, in accordance with one or more embodiments of the disclosed subject matter.

FIG. 10 is a screenshot 1000 of the main screen 800 in the governed search system in FIG. 8 showing a pull-down menu of available information domains to the user, in accordance with one or more embodiments of the disclosed subject matter. In FIG. 10, the domain selection section 806 is shown in a pulled down configuration with a list of domains 1010 available for the user to select to search. This feature enables users to limit their search requests to a particular domain, ensuring relevance and precision in the returned results. By not selecting any of the listed domains 1010, the system defaults to search all of the available domains, which includes the listed domains 1010.

FIG. 11 is a screenshot 1100 of the main screen 800 in the governed search system 200 in FIG. 8 and FIG. 10 after a user has selected a domain and entered an initial set of search parameters, in accordance with one or more embodiments of the disclosed subject matter. In FIG. 11, in the domain selection section 806 the user has selected the "All Domains" option to search all of the data domains to which the user is authorized to access and the search parameter entry section 807 is highlighted to show a natural language search parameter request, "What is Aretec?", has been typed into the search parameter entry section 807 and before it has been submitted to the system for processing.

Figure 12:
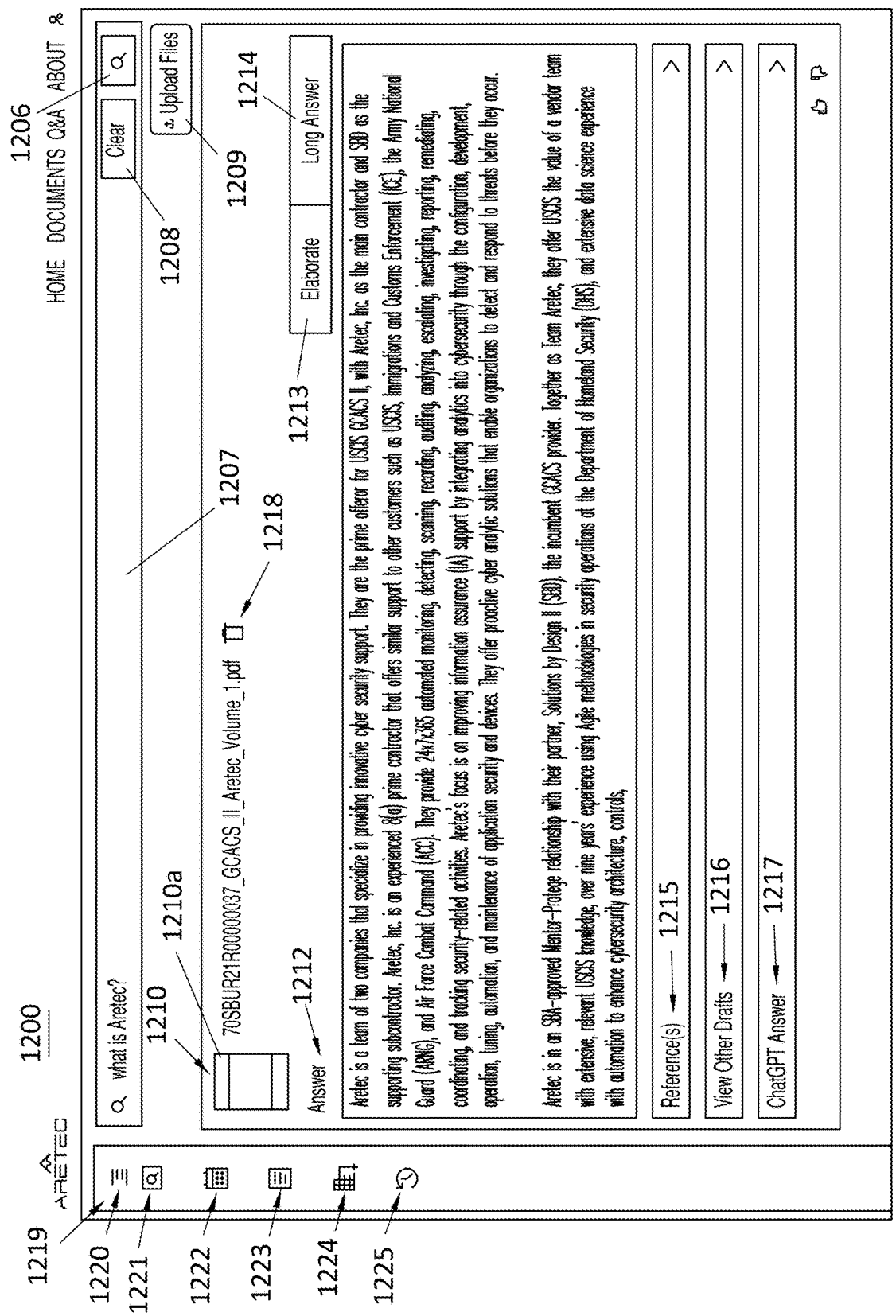
FIG. 12 is a screenshot of a search output screen in the governed search system created in response to the user selection of All Domains and entered initial search parameters in FIG. 11, in accordance with one or more embodiments of the disclosed subject matter.

FIG. 12 is a screenshot of a search output screen 1200 in the governed search system 200 created in response to the user selection of All Domains and entered initial search parameters shown in FIG. 11, in accordance with one or more embodiments of the disclosed subject matter. In FIG. 12, the search output screen 1200 is shown in which a response, or an answer, to the search parameter request, "What is Aretec?", which is shown in a search output screen search parameter entry section 1207 and that the user can edit directly in this screen to refine the search results. Included in the search output screen search parameter entry section 1207 is a "clear" button 1208, which when selected clears the search output screen search parameter entry section 1207 and a search icon 1206, which when selected performs a search of the system 200 database using the domain or domains selected in the domain selection section 806 and the entered search parameter request in the search output screen search parameter entry section 1207, which is configured to permit a user to modify the search parameter request from this screen. In the present embodiment, immediately below the search output screen search parameter entry section 1207 is displayed a source document(s) section 1210 in which is displayed a list of documents 1210*a* that were searched based on the selected domain or domains and the entered search parameter request and a document name and a document type for each document 1210*a* is also included. Associated with each document 1210*a* in the list is a trashcan icon 1218, which can be used to delete the document 1210*a* from the list. Although in this exemplary embodiment only a single document 1210*a* is shown, any number of documents can be shown in the source document(s) section 1210 and the number is only limited by the user's query request and however many documents were available to be used as source documents. Below the list of the source document(s) 1210 is an answer section 1212 in which the governed search system 200 has generated a natural language answer or response to the entered search parameter request using information located in the list of source documents 1210.

In FIG. 12, the search output screen 1200 includes two distinct links: an "Elaborate" link 1213 and a "Long Answer" link 1214. These links introduce an innovative layer of interactivity, which is configured to enable users to search for alternative answers with varying levels of detail. Specifically, the "Elaborate" link 1213, when selected, uses the capabilities of advanced language models such as LLM, ChatGPT, and more to reinterpret the existing answer in the answer section 1212 by adding supplementary layers of detail derived from the uploaded documents and the context of the search prompt. This transformative process results in an answer that is inherently more comprehensive, tailored to the specific context and intricacies of the user's inquiry to provide a deeper dive into the subject matter. The "Long Answer" link 1214, when activated, generates an answer with an even greater depth of information than the "Elaborate" link 1213. This answer generated using the "Long Answer" link 1214 incorporates additional insights that were not explicitly provided in the initial answer in the answer section 1212. The answer generated using the "Long Answer" link 1214 approach provides a comprehensive narrative that includes supplementary details and perspectives. As a result, the answers generated using the "Elaborate" link 1213 and the "Long Answer" link 1214 from the initial answer generated from the search request and provided in the answer section 1212 of the search output screen 1200 provide a highly nuanced approach to response generation, by providing varying levels of information depth. It is this interactive framework that transcends the realm of mere text-based responses to take advantage of the power of AI to adapt and evolve in response to user interaction and information context. Also included on the search output screen 1200 is a link to a list of suggested references 1215 that are likely to contain additional relevant information and can help users explore and deepen their understanding of the query topic, a link to view prior drafts of the output in the answer section 1212, and a link to a ChatGPT generated answer 1217, which can be compared to the answer 1212 provided by the system 200.

Figure 13:
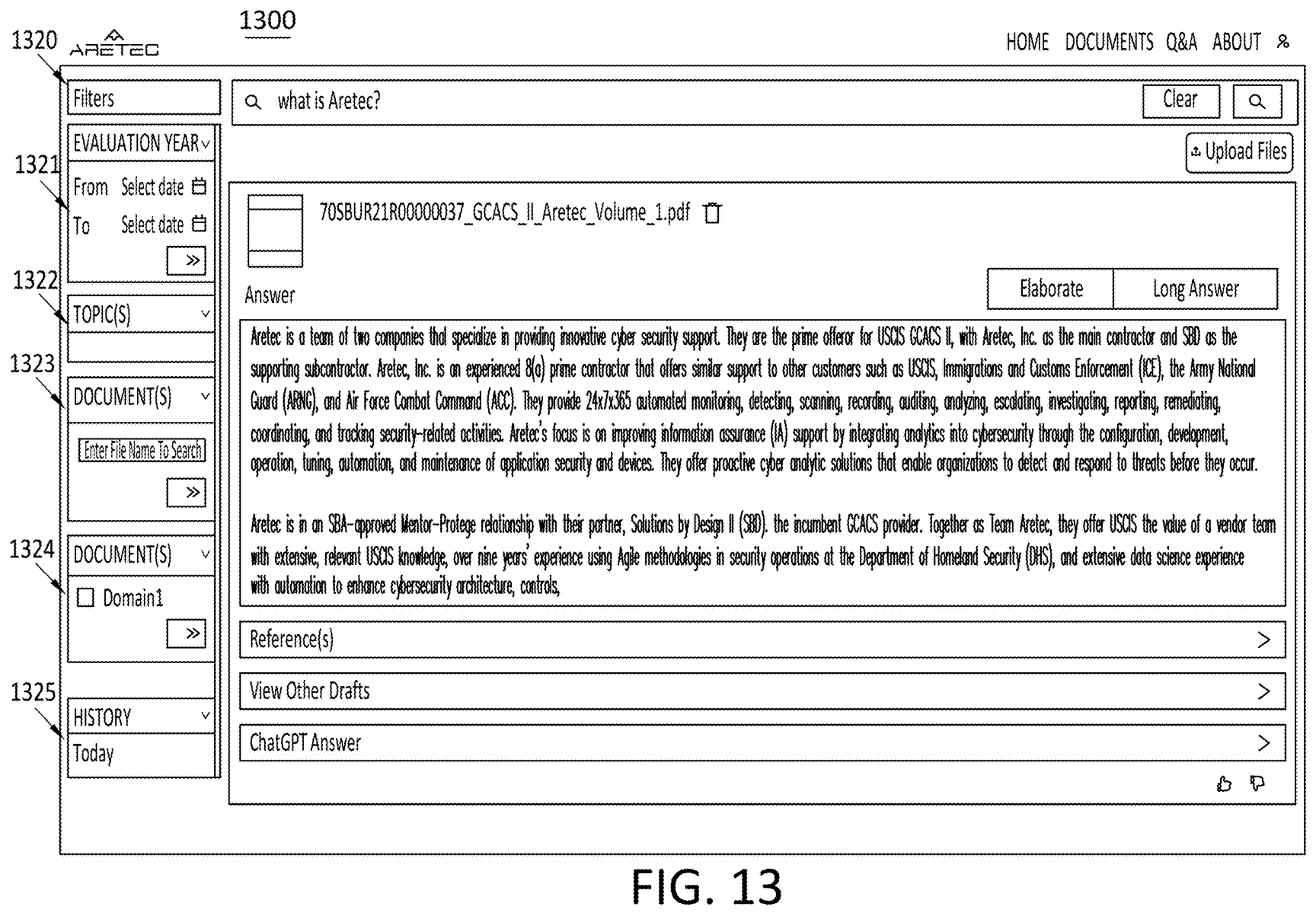

In the embodiment in FIGS. 12 and 13, a column of menu icons 1219 is included on a left side of the output search screen 1200 and the column of menu icons 1219 includes a plurality of functional menu icons configured to permit the user to refine the search results. For example, a filter icon 1220, which, when selected, opens a filter menu 1320 with a list of available filters that can be applied to the search parameter request and is best seen in FIG. 13. For example, although not shown in FIG. 12 or FIG. 13, these filters can include, but are not limited to, a domain filter, a date filter, a file/document name filter, and a customizable filter that can be defined by the user or system administrator. Another icon is an evaluation year icon 1221, which, when selected, opens an evaluation year menu 1321 where the user can specify a period between two dates in which the source documents to be searched must have been created. Yet another icon in the column is a topic(s) icon 1222, which, when selected, opens a topic(s) menu 1322 that can be used to enter or select specific topics that are to be the subject of the search. The next icon in the column is a document(s) icon 1223, which, when selected, opens a document(s) menu 1323 that enables the user to select specific documents in the selected domain to be used in the search. Another icon in the column is a domain(s) icon 1224, which, when selected, opens a domain(s) menu 1324 and provides a selectable list of available domains that can be used in the search based on the user's authorized access level. The final icon in the column is a history icon 1225, which, when selected, opens a history menu 1325 and allows users to track and review their activity within the platform, providing a log of their actions and interactions. This feature enables users to revisit previous searches, document views, and other relevant activities. Of course, other embodiments are contemplated with the icons in different orders and/or locations, more or less icons, and with different icons.

Figure 14A:
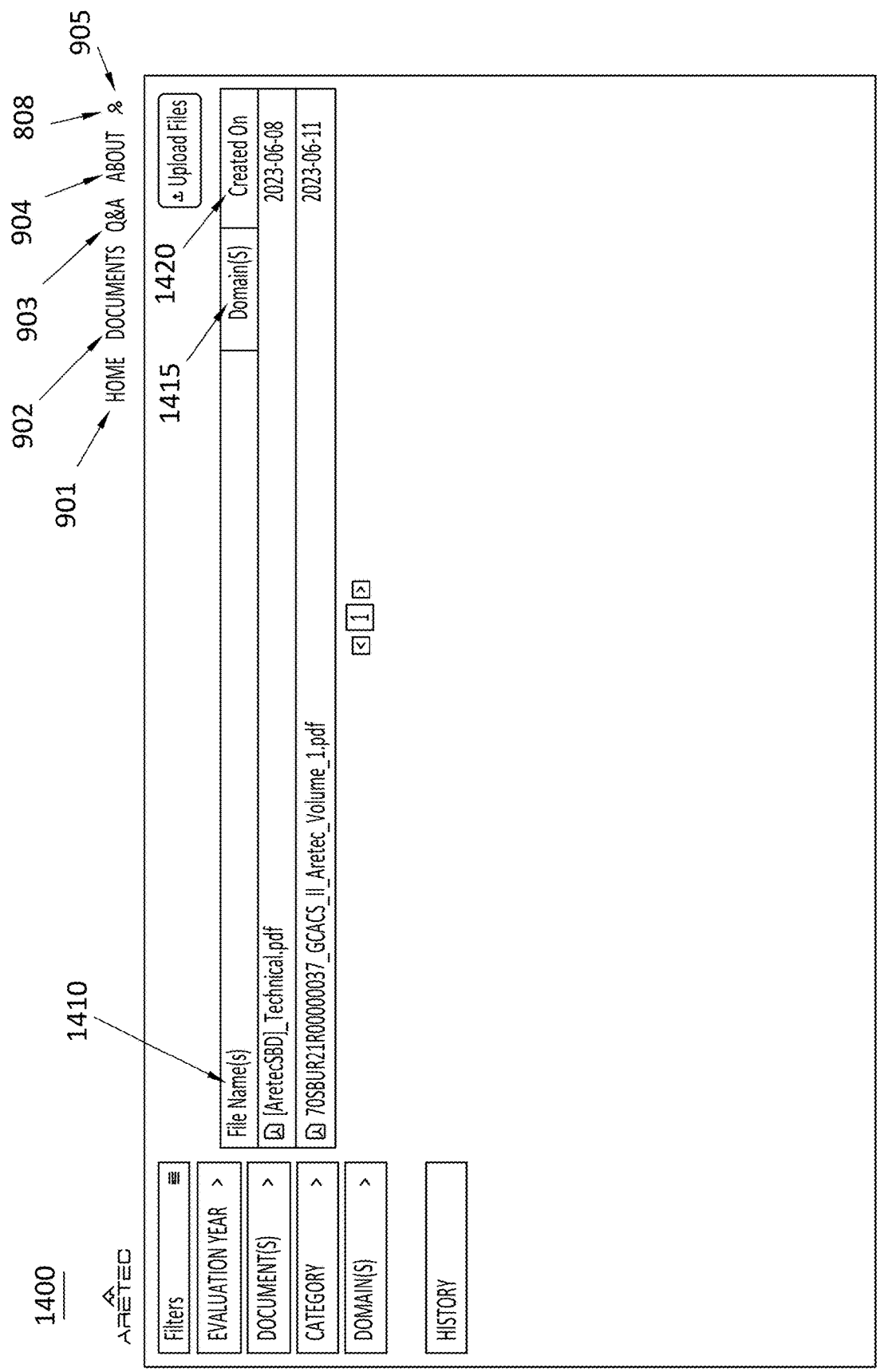
FIG. 14-A is a screenshot of the document section of governed search system, featuring a filters menu and the navigation bar, in accordance with one or more embodiments of the disclosed subject matter.
Figure 14B:
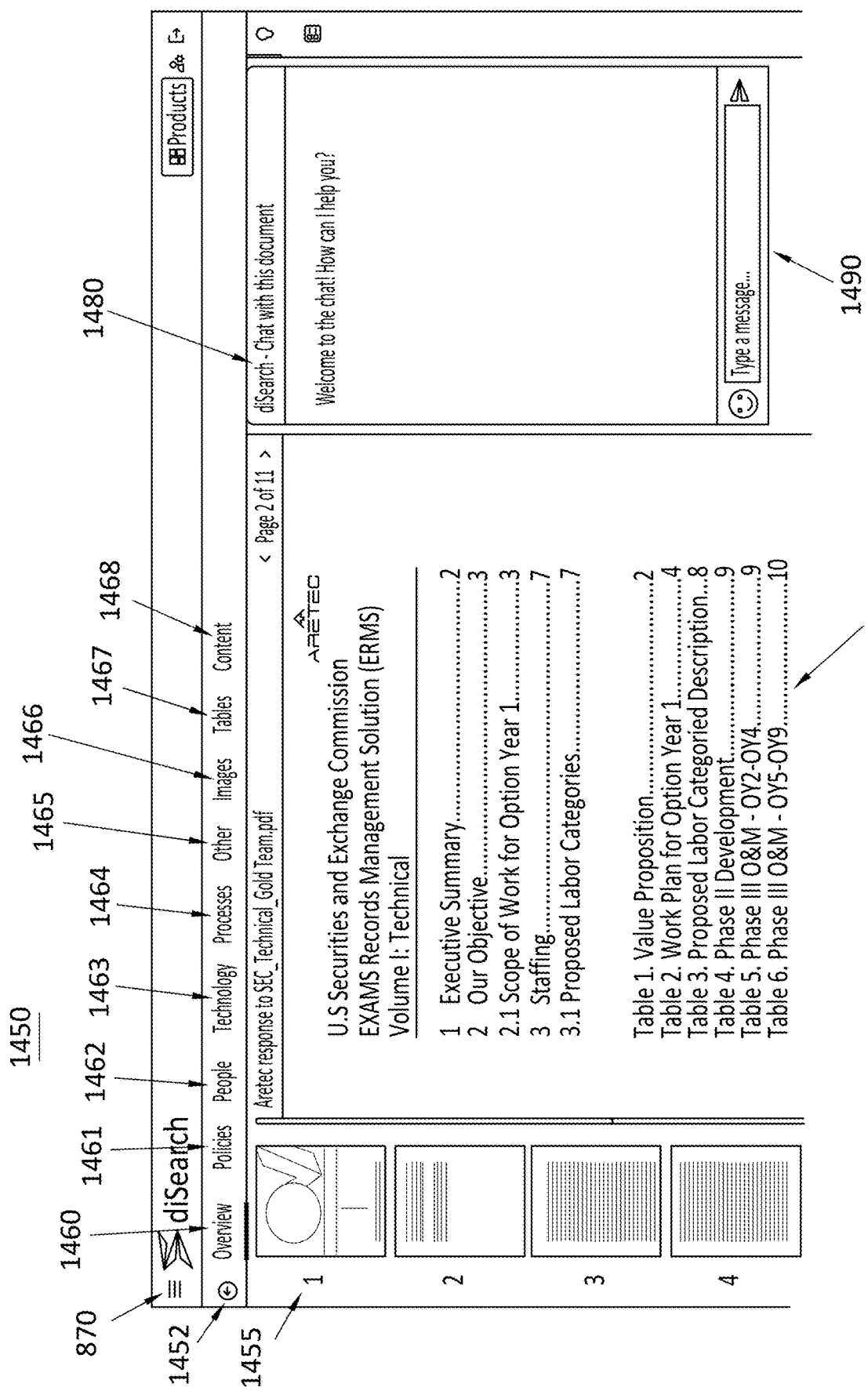

FIG. 14A is a screenshot of the search output screen 1200 in the governed search system in FIG. 13 showing the filter menu tab with all the icons being minimized, in accordance with one or more embodiments of the disclosed subject matter. In FIG. 14A, a documents screen 1400 is shown in which the documents menu option 802 has been selected and the file names 1410 of the documents that are available to the current user are listed. In addition to the file names 1410, a domain location 1415 for each file and a date on which each file was created 1420. FIG. 14B is a screenshot of a document output screen 1450 with an output document display section 1470 showing a page of a document generated in response to a search request and a document chat section, in accordance with one or more embodiments of the disclosed subject matter.

In FIG. 14B, the document output screen 1450 includes a resources menu bar 1452, which includes an overview menu item 1460, a policies menu item 1461, a people menu item 1462, a technology menu item 1463, a processes menu item 1464, another menu item 1465, an images menu item 1466, a tables menu item 1467, and a content menu item 1468. The overview menu item 1460 when selected is configured to enable the user to present the source documents section 1455 with a menu bar with numbered icons to facilitate swift page selection. The policies menu item 1461 when selected is configured to enable the user to identify policies that are applicable to the document. These policies may include, but are not limited to, PII Data, GDPR, HIPPA or other compliance standards/policies. The people menu item 1462 when selected is configured to enable the user to identify people mentioned in the document and any other organizations or departments referenced in the document. The technology menu item 1463 when selected is configured to enable the user to access relevant technical information referenced in the document. The processes menu item 1464 when selected is configured to enable the user to identify any process information, such as process flows or instructions, contained in the document. The other menu item 1465 when selected is configured to enable the user to write custom prompts and extract information from documents. The images menu item 1466 when selected performs the task of extracting and presenting all the images contained within the document on the current page. This functionality provides users with a convenient and consolidated platform to view all the visual content within the document in one cohesive location. Moreover, each individual image can be zoomed in and out, ensuring a detailed examination and a tailored viewing experience according to the user's preferences. The tables menu item 1467 when selected is configured to enable the user to access and view all the tables present within the document. This functionality simplifies the process of observing and understanding the tabular data by extracting and presenting all tables on a single page. This consolidated presentation enhances the user experience, making it considerably more efficient and straightforward to analyze and interpret the data contained within the tables of the document. The content menu item 1468 when selected is configured to enable the user to access a comprehensive summary of the content encompassed by the entire document. This functionality simplifies the process of grasping the document's central focus and key points. It provides users with an efficient means of gaining a holistic understanding of the document's contents, aiding in more effective and expedient information retrieval.

In FIG. 14B, the document output screen 1450 includes in the output document display section 1470, a chat section 1480, and a chat message entry area 1490. The output document display section 1470 is configured to display a dynamic interface for displaying multi-page documents in response to the user's search request. This section empowers users with the ability to comprehensively review the document, page by page. This user-friendly feature allows for efficient and in-depth exploration of the document's content, facilitating a thorough understanding of the information within. Users can quickly and easily navigate through the document, examining each page at their own pace and convenience, which greatly enhances the overall usability of the system and the effectiveness of the search process. The chat section 1480 provides for an interactive user experience by enabling users to engage in a dynamic and conversational interaction with the document displayed in the output Document Display section 1470, which is generated in direct response to their search query. This chat/message board interface is designed for seamless communication, enabling users to intuitively query and seek information from the document. The AI Chatbot feature provides context-aware responses. In other words, this feature comprehends the content within the displayed document and provides tailored answers, enhancing user engagement and facilitating a productive dialogue with the document's context. As a result, this feature can transform the search and review process into a collaborative conversation, making information retrieval more intuitive and efficient. The chat message entry area 1490 is configured to receive messages that are entered into the chat message entry area 1490 by the user. The document output screen 1450 also includes a source documents section 1455, which displays selectable thumbnail images of the source documents used by the system to generate the response. In this embodiment, the source documents section 1455 is shown in a vertical configuration, although in other embodiments the section could also be, for example, but not limited to, in a horizontal configuration or implement as a pull-down menu.

Figure 15:
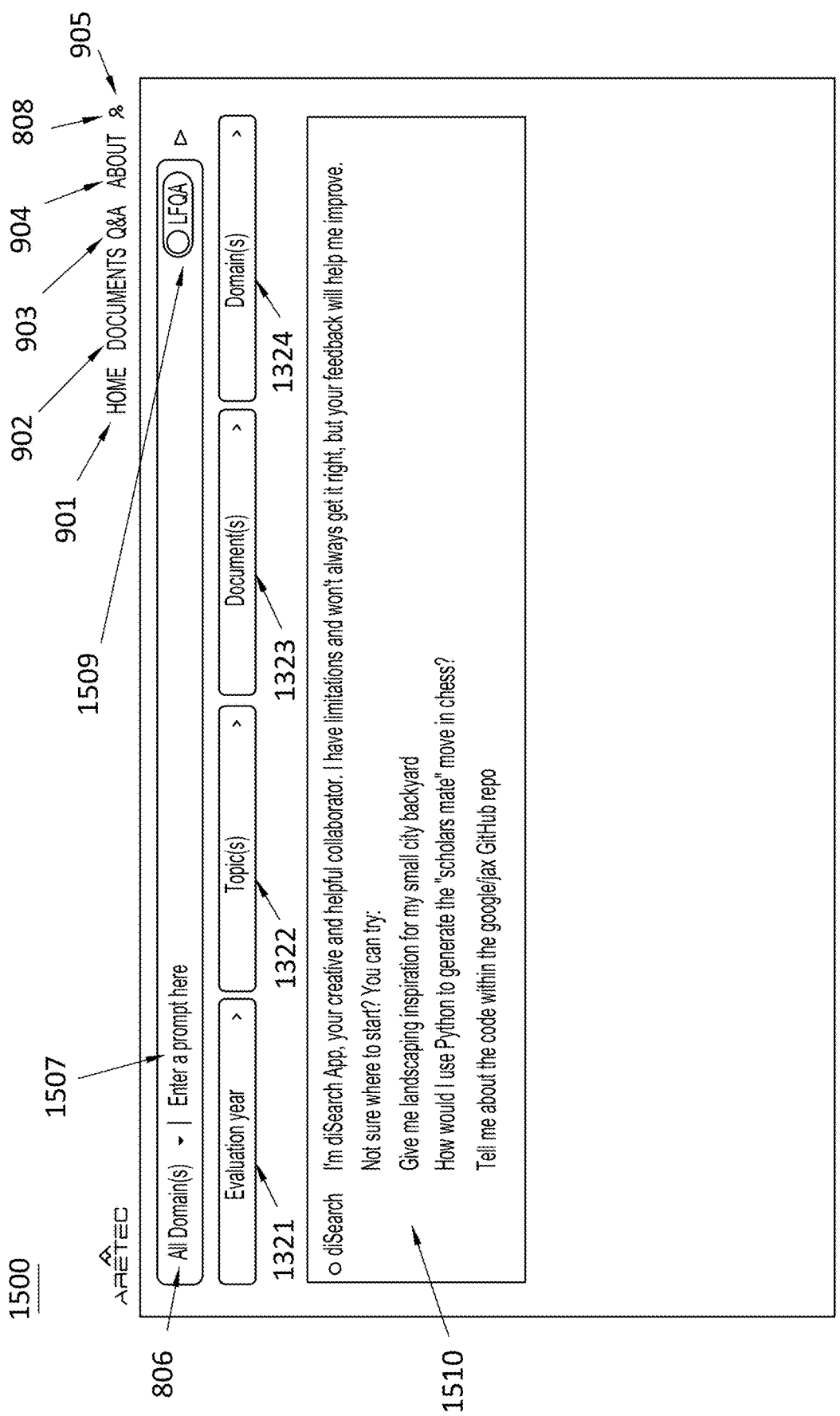
FIG. 15 is a screenshot of a Q&A section of the interface, in accordance with one or more embodiments of the disclosed subject matter.

FIG. 15 is a screenshot of a question and answer (Q&A) output screen 1500, in accordance with one or more embodiments of the disclosed subject matter. In FIG. 15, the Q&A output screen 1500 is shown after the Q&A menu option 803 has been selected and includes a Q&A question or search entry section 1507 in which the user can enter questions or search requests. The Q&A question or search entry section 1507 also includes the domain selection section 806 and a LFQA toggle 1509 that when selected connects the user to a distinctive mode of query assistance called "Low-Fidelity Query Assistance," which is an innovative search approach that enhances the user's experience. Upon activation, the LFQA toggle 1509 facilitates an AI-driven interpretation of user queries, which can process and respond to vague or imprecise inputs. This feature offers a unique and responsive user interaction by offering suggestions, prompts, or modified queries in an attempt to express the user's intent more accurately to more effectively guide users toward more refined search outcomes. In the Q&A output screen 1500, the menu options from FIGS. 13-14 for the evaluation year menu 1321, the topic(s) menu 1322, the document(s) menu 1323, and the domain(s) menu 1324 are now shown in their unexpanded configurations and available in a row under the Q&A question or search entry section 1507. The Q&A output screen 1500 also includes an information section with suggestions for questions and/or search requests that can be entered in the Q&A question or search entry section 1507.

Figure 16:
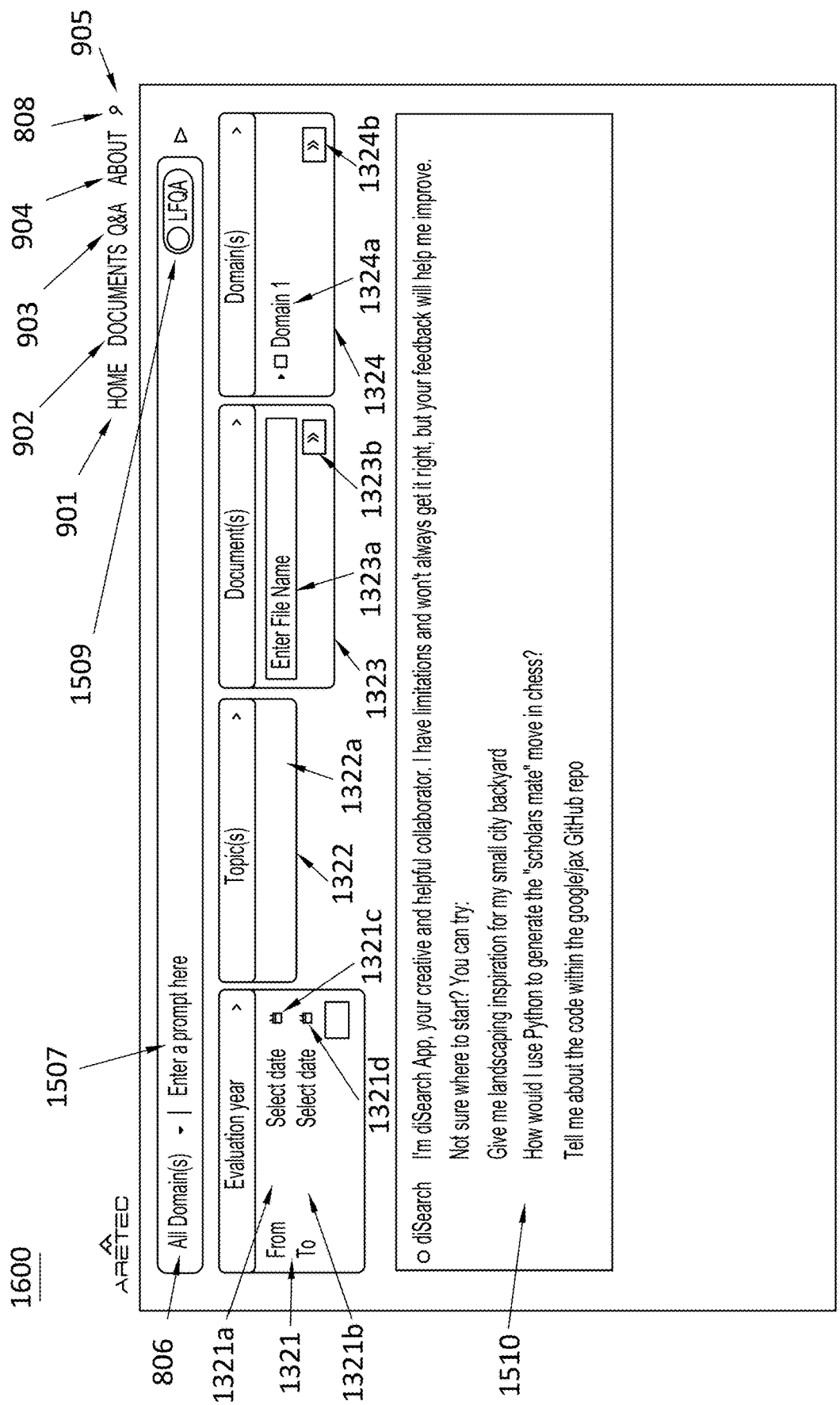
FIG. 16 is a screenshot of a Q&A section of the interface in FIG. 15 with the menu options expanded, in accordance with one or more embodiments of the disclosed subject matter.

FIG. 16 is a screenshot of the question and answer (Q&A) output screen 1500 of FIG. 15 with the menu options shown in an expanded form for the user to enter and/or select search request information, in accordance with one or more embodiments of the disclosed subject matter. In FIG. 16, an expanded Q&A output screen 1600 can include the evaluation year menu 1321, the topic(s) menu 1322, the document(s) menu 1323, and the domain(s) menu 1324 are shown in their expanded configurations to provide users with the ability to precisely control their search parameters to achieve the needed targeted results. In the evaluation year menu 1321 a from entry space 1321a and a to entry space 1321b are shown and configured to accept dates between which the system is to apply the search request. The entry spaces can accept a direct entry of the dates or the user can use a from calendar icon 1321c and a to calendar icon 1321d to display calendars through which the user can select the from and to dates by clicking on a specific day for each. If no date range is entered by the user, the system 200 defaults to search without a time limitation, so it searches all data stored in the system. In the topics menu 1322 a text entry box 1322a is shown that is configured to accept direct input from the user on information is requested. The input can be as natural language requests, Boolean requests, or both. In the documents menu 1323, a file name window 1323a is shown and configured to receive a file name or file names and includes a file open icon 1323b, which when selected opens a listing of the file names available for the user to select. In the domains menu 1324, a domain name window 1324a is shown to include a list 1324a of the available domains and is configured to permit the user to select oner or more domains from the list and includes a domain list expand icon 1324b, which when selected opens a listing of the domain names available for the user to select for their search.

Figure 17:
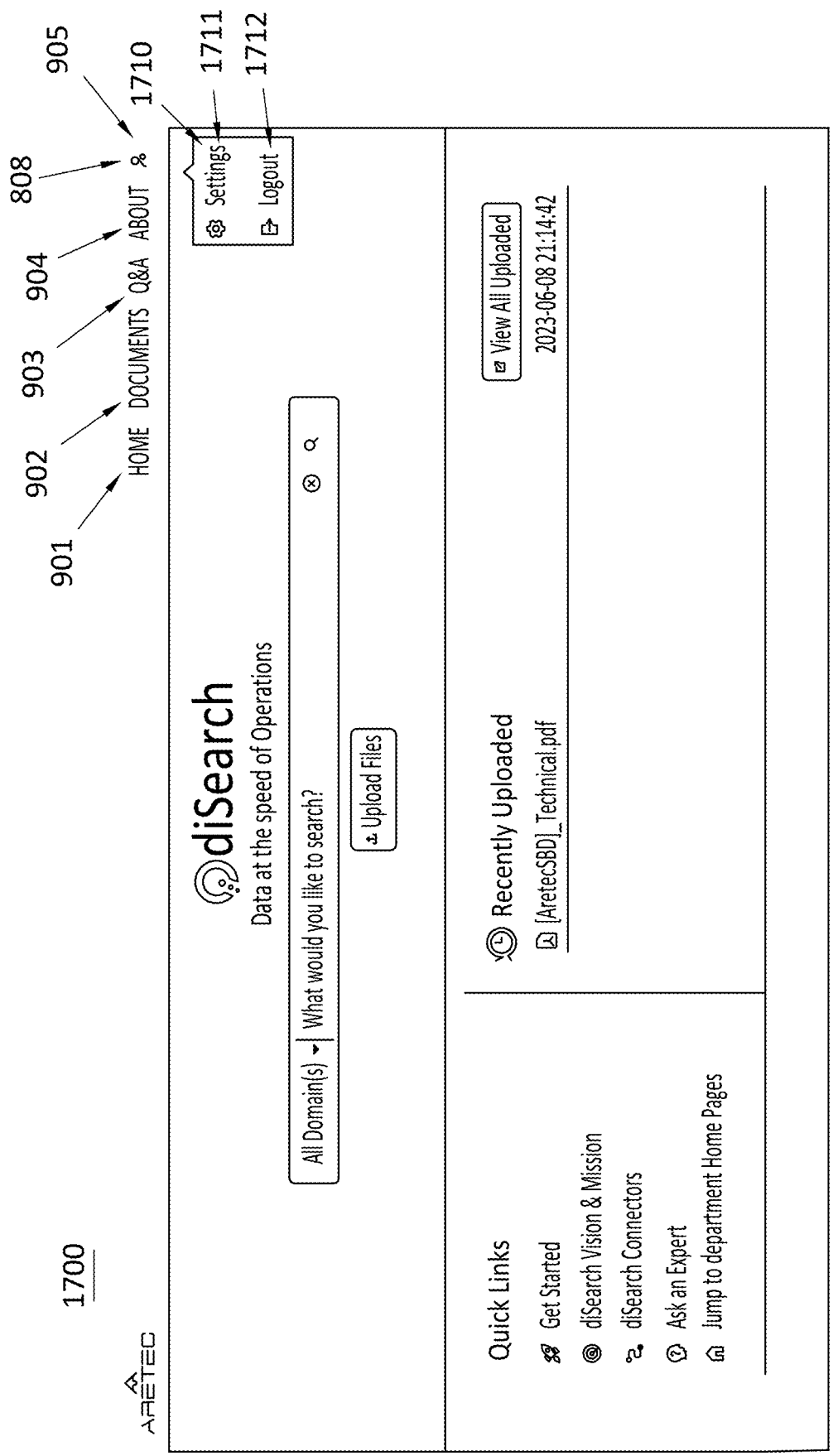
FIG. 17 is a screenshot of a homepage of the governed search system with an actions tab menu displayed, in accordance with one or more embodiments of the disclosed subject matter.

FIG. 17 is a screenshot 1700 of the search/upload screen 800 of FIG. 8, in accordance with one or more embodiments of the disclosed subject matter. In FIG. 17, the actions menu option 808 has been selected and a drop-down menu 1710 with a settings menu option 1711 and a logout menu option 1702 are shown and which will be described in more detail below in relation to FIGS. 18-20.

In FIG. 17, in the search/upload screen 800, which is a central hub within the platform's interface, the settings menu option 1711 when selected, is configured to open a system settings page to permit the user to tailor the systems 200 behavior and configuration to align with their preferences and requirements.

Figure 18:
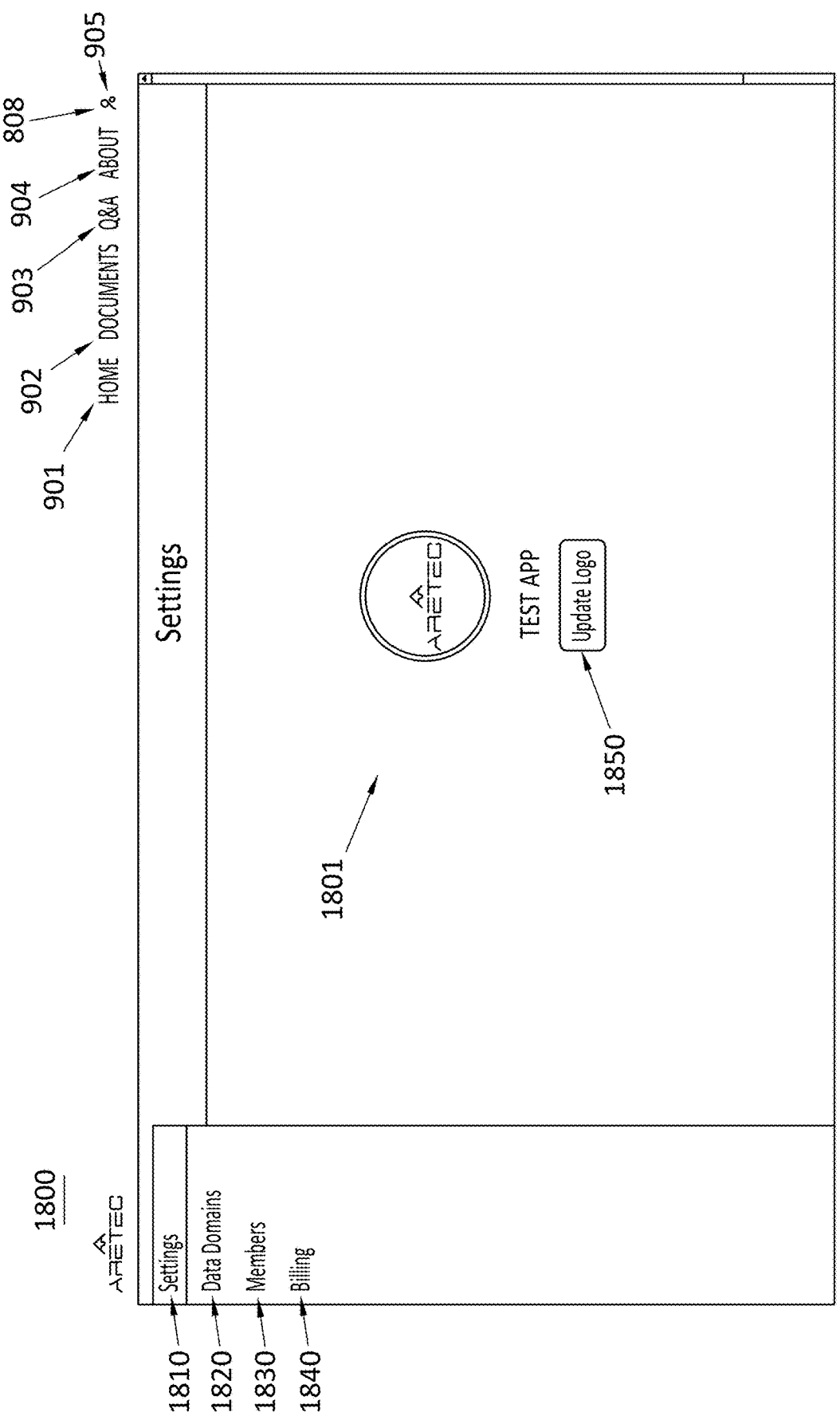
FIG. 18 is a screenshot of a settings page of the governed search system, in accordance with one or more embodiments of the disclosed subject matter.

FIG. 18 is a screenshot of a system settings page 1800, in accordance with one or more embodiments of the disclosed subject matter. On a left side of the system settings page 1800, is shown a settings menu option 1810, which is shown as having been selected and a settings display section 1801 is displayed. Also shown in the system settings page 1800 is a data domains menu option 1820, a members menu option 1830, and a billing menu option 1840. Centered on the settings display 1801 is a company logo and an update logo button 1850, which, when selected, permits the user to update the logo that will be displayed in the system.

Figure 19:
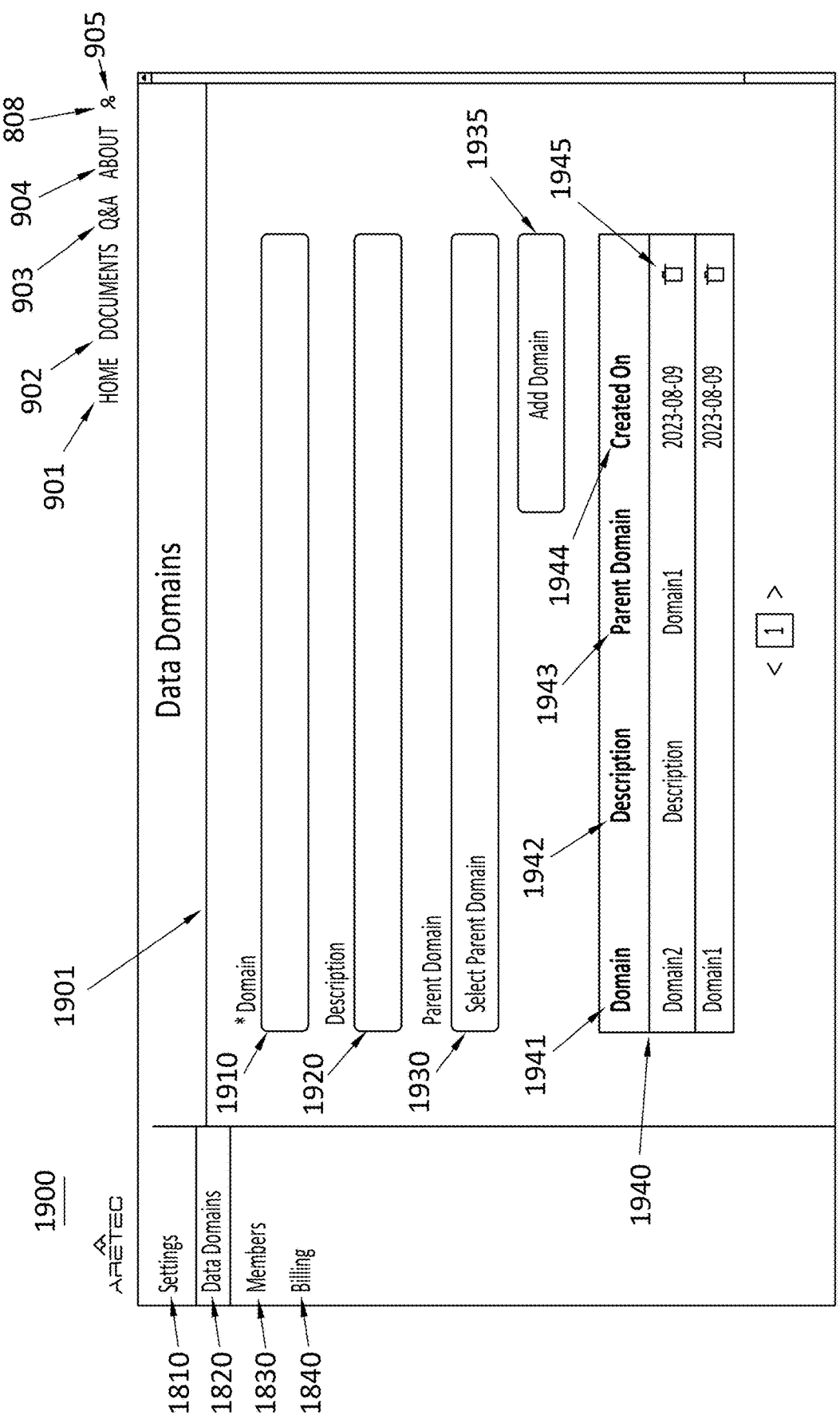
FIG. 19 is a screenshot of a data domains page of the governed search system, in accordance with one or more embodiments of the disclosed subject matter.

FIG. 19 is a screenshot of the actions option screen of FIG. 18 after the data domains menu option has been selected, in accordance with one or more embodiments of the disclosed subject matter. In FIG. 19, a data domains actions option screen 1900 is shown after the user has selected the data domains menu option 1820. The data domains actions option screen 1900 includes a data domains display section 1901, which includes a required domain entry field 1910 in which a name for the new domain must be entered, an optional description field 1920, an optional parent domain field 1930, and an add domain button 1935, which, when selected, opens an add domain section 1940 to enable the user to add domains.

In FIG. 19, in the add domain section 1940, a number of information fields open for the user to define a new domain, including, but not limited to, a domain name 1941 for the new domain and an optional description field 1942 to permit the user to provide a concise description of the domain's purpose, to enhance general user comprehension and navigability within the system. The add domain section 1940 further includes an optional parent domain entry field 1943 which enables the user to link the new domain with an existing "parent" domain, if applicable, to create a structured framework that aligns with the user's organizational hierarchy. The add domain section 1940 still further includes a created-on field 1944, which is the date on which the document was created and can be a manual user entry or automatically generated by the system 200 and a delete icon 1945, which is shown as a trashcan and that, when selected, will delete the domain name with which it is associated.

Figure 20:
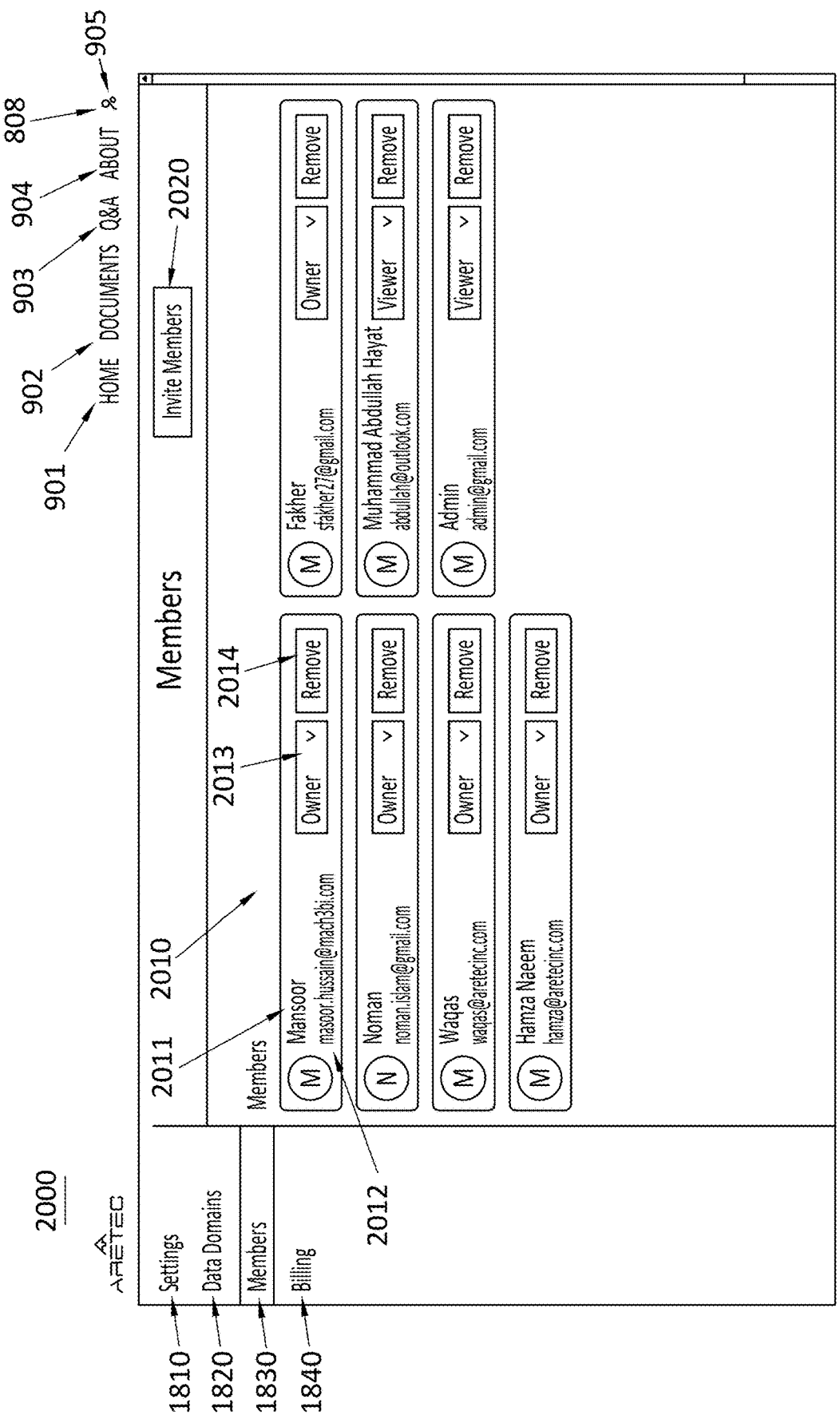
FIG. 20 is a screenshot of a member's page of the governed search system, in accordance with one or more embodiments of the disclosed subject matter.

FIG. 20 is a screenshot of the actions option screen of FIG. 18 after shown after the user has selected the members menu option 1830, in accordance with one or more embodiments of the disclosed subject matter. In FIG. 20, a members actions option screen 2000 includes a listing of the registered members 2010 with a user name 2011, a user email address 2012, a user type 2013 that is implemented as a pull-down menu and is used to define each member's role and responsibilities, and a remove button 2014. However, one member does not have the user type 2013 or the remove button 2014 enabled, because they are the system administrator with unlimited rights and cannot be deleted from the system 200, which is to ensure that the system administrator role is never deleted. The members actions option screen 2000 also includes an invite members button 2020, which, when selected, enables the system administrator or an owner to invite and add a new member to the members list 2010.

Figure 21:
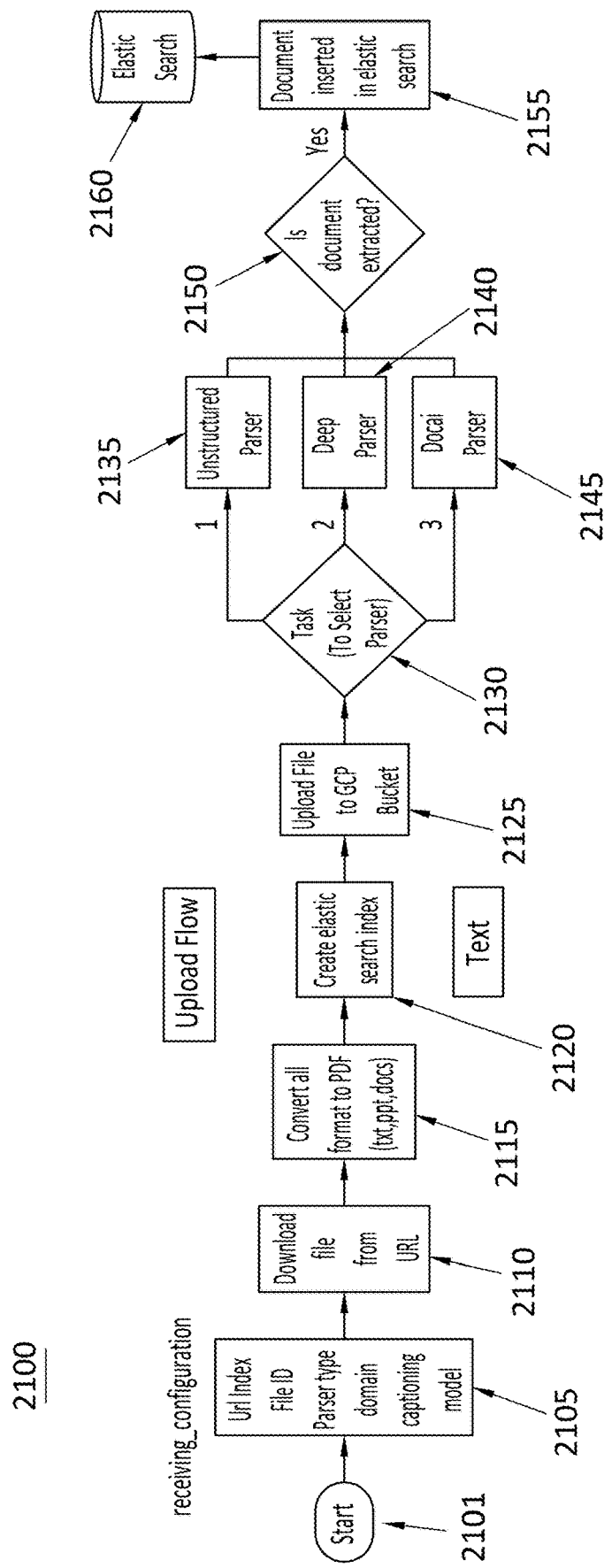
FIG. 21 is a process flow diagram of how an uploader application programming interface (API) processes input files, in accordance with one or more embodiments of the disclosed subject matter.

FIG. 21 is a process flow diagram of how a file upload application programming interface (API) uploads files into the system, in accordance with one or more embodiments of the disclosed subject matter. In FIG. 21, a file upload process flow diagram 2100 starts 2101 and receives 2105 file configuration information including, for example, but not limited to, a source URL, a file index, a file ID, a parser type to be used with the file, a target domain for the file, and a captioning model for use with the file. The upload process then downloads 2110 the file from the provided URL and, if not already a PDF file, the process converts 2115 the downloaded file to a PDF 2115. The process then creates 2120 a vector database, with embeddings. At its most basic, embedding is the process of converting human readable/discernable elements, for example, but not limited to, text, images, tables, and their relationships to each other in the pdf document into a number-based vector representation of the human readable/discernable text, images, tables, and their relationships to each other in the pdf document that a computer can read and process. It is this embedding that enables artificial intelligence (AI) to learn and work. The process then uploads the converted file into a Google cloud provider (GCP) bucket. The process then determines 2130 which parser to use to process, that is, extract, the converted PDF file. In the present embodiment, parser options include, but are not limited to, an unstructured parser 2135, a deep parser 2140; and a doc ai parser 2145. After the file has been parsed by the selected parser, the process determines 2150 whether the provide file has been completely extracted. If it is determined 2150 that the document was not completely extracted, although not shown for clarity, the process can loop back to the select parser 2130 step and then re-parse the incomplete portion of the file using the selected parser or, at the system's or the user's option, all of the file can be re-parsed. If it is determined 2150 that the document was completely extracted, then the process continues, and the parsed document is inserted 2155 into a vector database 2160.

Figure 22:
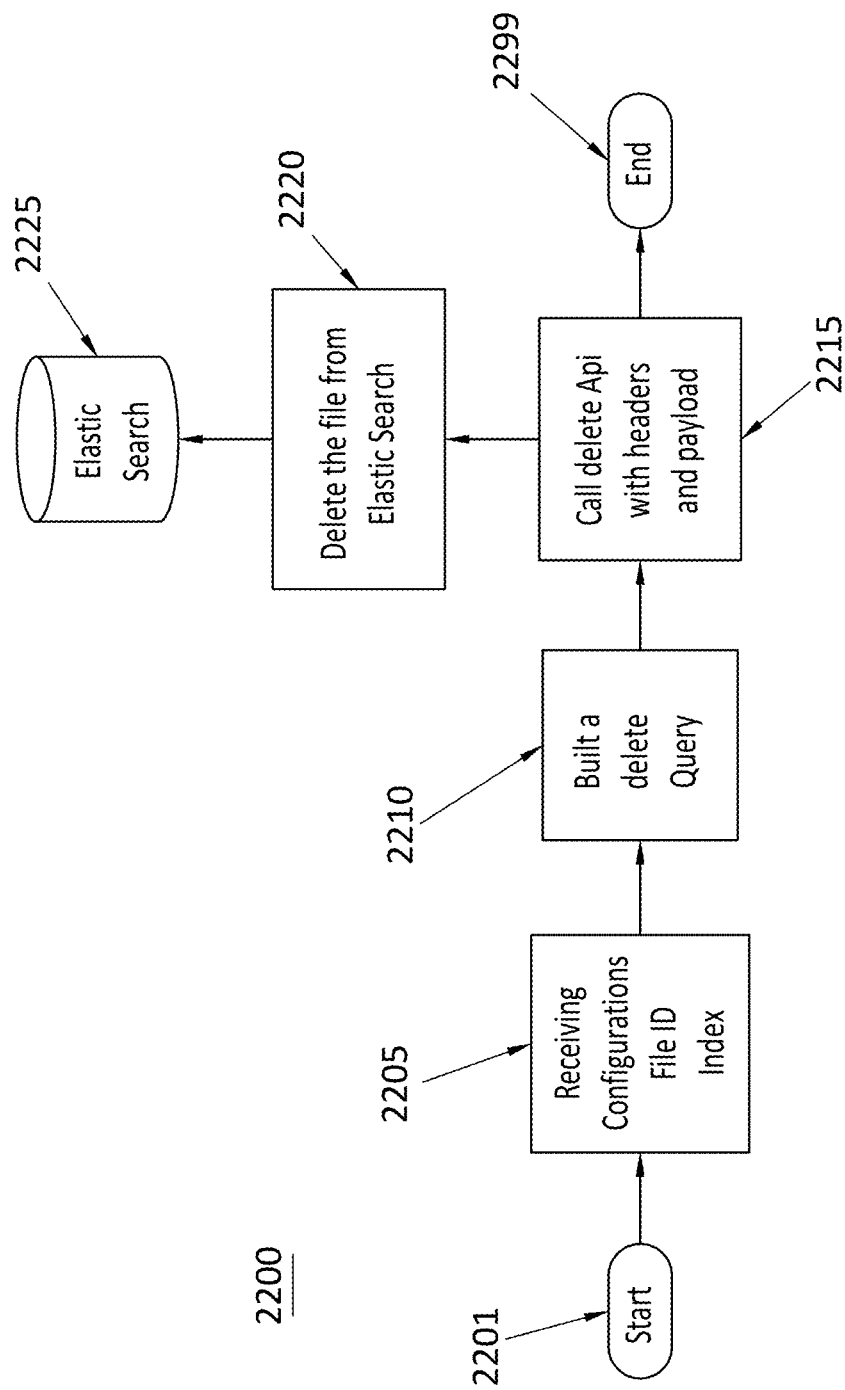
FIG. 22 is a process flow diagram of how a delete application programming interface (API) deletes entire files from a given index, in accordance with one or more embodiments of the disclosed subject matter.

FIG. 22 is a process flow diagram of how a delete application programming interface (API) deletes a given file, in accordance with one or more embodiments of the disclosed subject matter. In FIG. 22 a delete flow process 2200 starts 2201 and receives the file configurations 2205 including, but not limited to, a file ID and an index of the file to be deleted. The process continues and builds a deleted query 2210, to locate the file or files to be deleted. The process then calls the delete API and sends the file configuration information 2215 with headers and a payload. In general, headers and payloads together form the structure of an API request, with headers providing instructions and metadata, while the payload carries the specific data to perform the intended operation, like file deletion in this scenario. The process then deletes the file 2220 from a vector database 2225.

Figure 23:
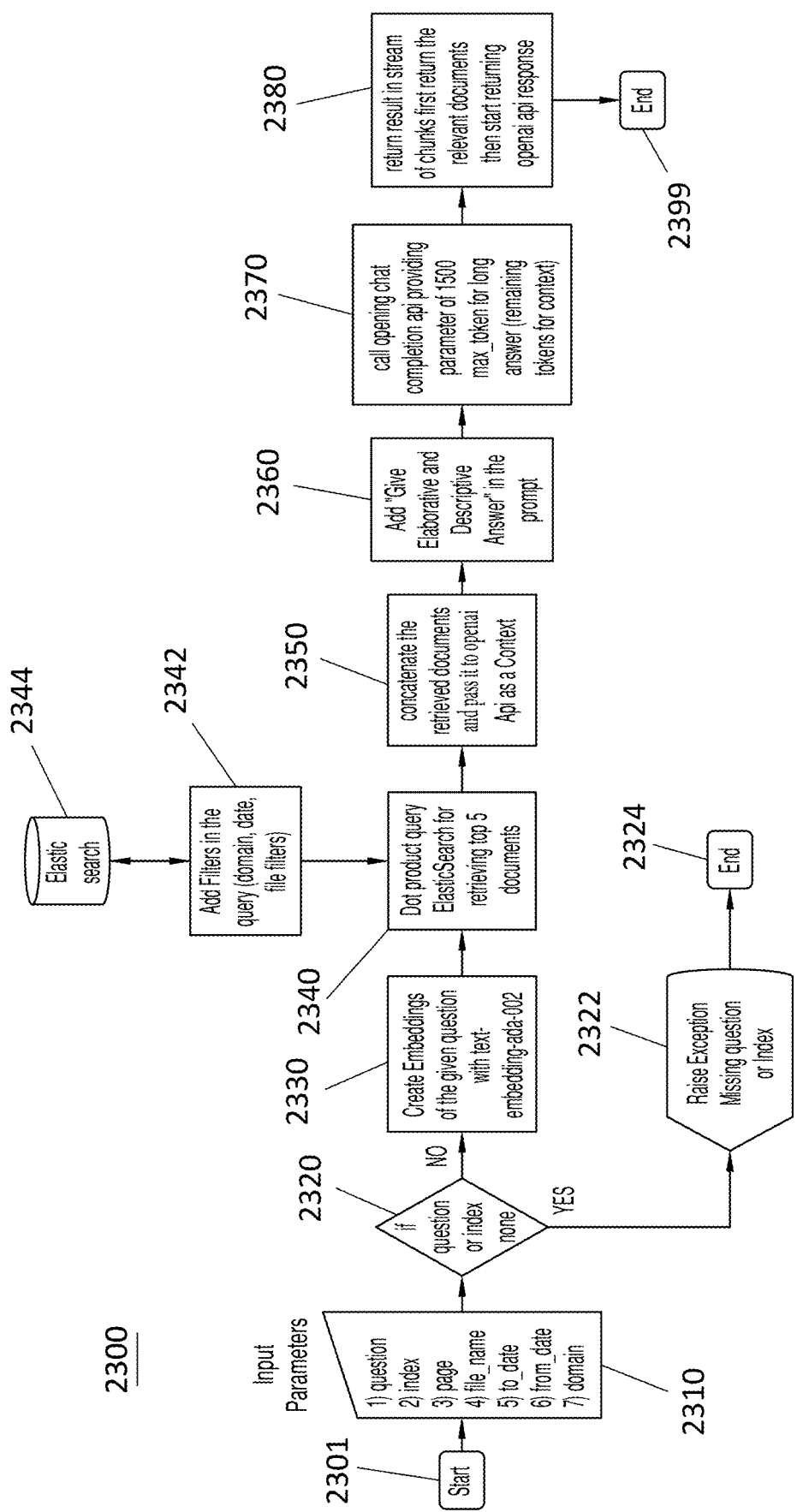
FIG. 23 is a process flow diagram of how an application programming interface (API) generates an answer to a query, in accordance with one or more embodiments of the disclosed subject matter.

FIG. 23 is a process flow diagram of how a query application programming interface (API) generates an answer to a search request, in accordance with one or more embodiments of the disclosed subject matter. In FIG. 23, a search process flow diagram 2300 starts 2301 and receives 2310 search input parameters including, but not limited to, a question (that is, a search request), an index, a page, a file name, a to-date, a from-date, and a domain. The process then determines 2320 whether the question or the index is received and, if not, an exception is raised 2322 and the process either ends 2324 or loops back to receive 2310 the input parameters. If it is determined 2320 that the question and the index are received, the process continues to create embeddings 2330 of the given question using a text embedding model, for example, but not limited to, the text-embedding-ada-002 model from OpenAI. At its most basic, embedding is the process of converting human readable/discernable text, images, tables, etc. into a number-based representation of the human readable/discernable text, images, tables, etc. that a computer can read and process. It is this embedding that enables artificial intelligence (AI) to learn and work. The process then continues and creates 2340 a dot product vector database query to retrieve the top 5 documents, adds 2342 filters to the dot product query (for example, but not limited to, domain, date, and file filters) and then executes the query in a vector database 2344, for example, but not limited to, the Elasticsearch® database. The process continues to concatenate 2350 the retrieved documents and pass it to openAI API as a context to form a coherent context. The process then adds 2360 elaboration and description to create a detailed response. The process then calls 2370 the openAI chat completion API, with parameters set for a substantial 1500 maximum tokens to generate comprehensive answers. The process then returns 2380 the result in a stream of chunks to first return relevant documents before rendering the openAI response to the user. In general, chunks are segments or pieces of data that are transmitted or processed sequentially and, in the case of an API Response, chunks are the portions of answers or data that are sent back to the user in a step-by-step manner to optimize processing. The process then ends 2399.

Figure 24:
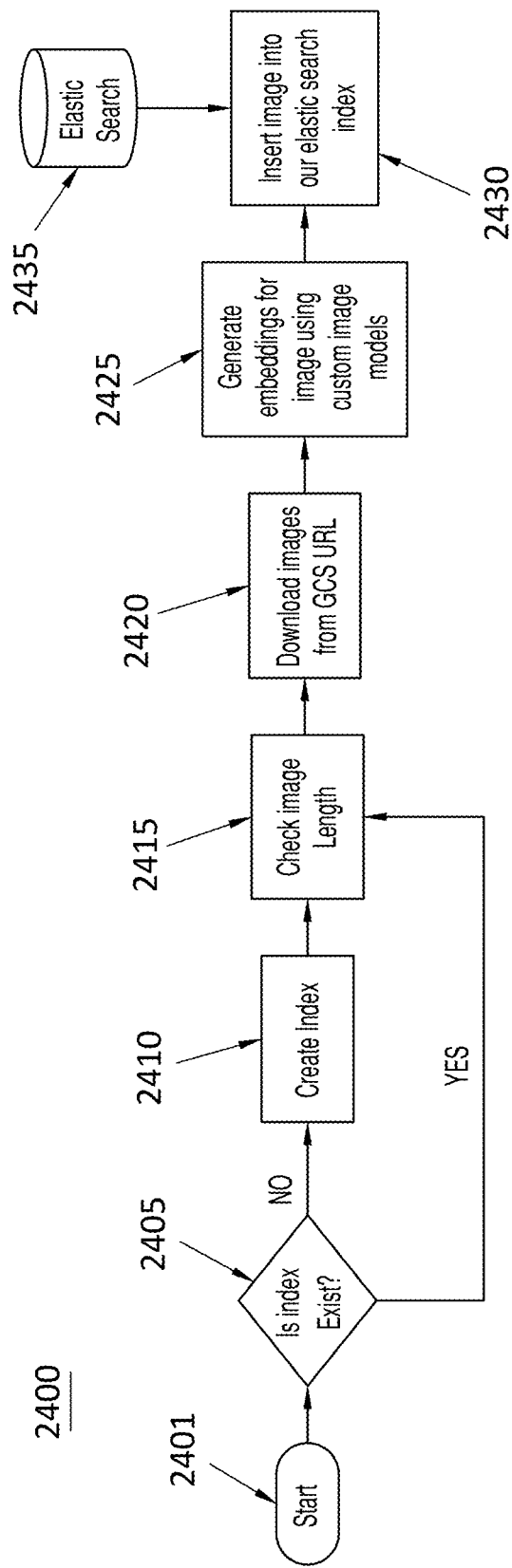
FIG. 24 is a process flow diagram of how an images index application programming interface (API) creates an image index and adds it to the system, in accordance with one or more embodiments of the disclosed subject matter.

FIG. 24 is a process flow diagram of how an image index is created in the system, in accordance with one or more embodiments of the disclosed subject matter. In FIG. 24, an image index flow diagram 2400 process for creating an image index for a document starts 2401 and determines 2405 whether the index exists. If it is determined 2405 that the image index does not exist, the process continues to create 2410 the index and then checks 2415 a length of the image. If it is determined 2405 that the image index does exist, then the process jumps ahead and checks 2415 the length of the image. The process then downloads 2420 images from the Google Cloud Storage (GCS) URL and then generates 2425 embeddings for the image, which describe the useful characteristics of the image, using custom image models including, for example, but not limited to, an image classification model, custom trained models. The process then inserts 2430 the image into a vector database 2435, for example, but not limited to, the Elasticsearch® database.

Figure 25:
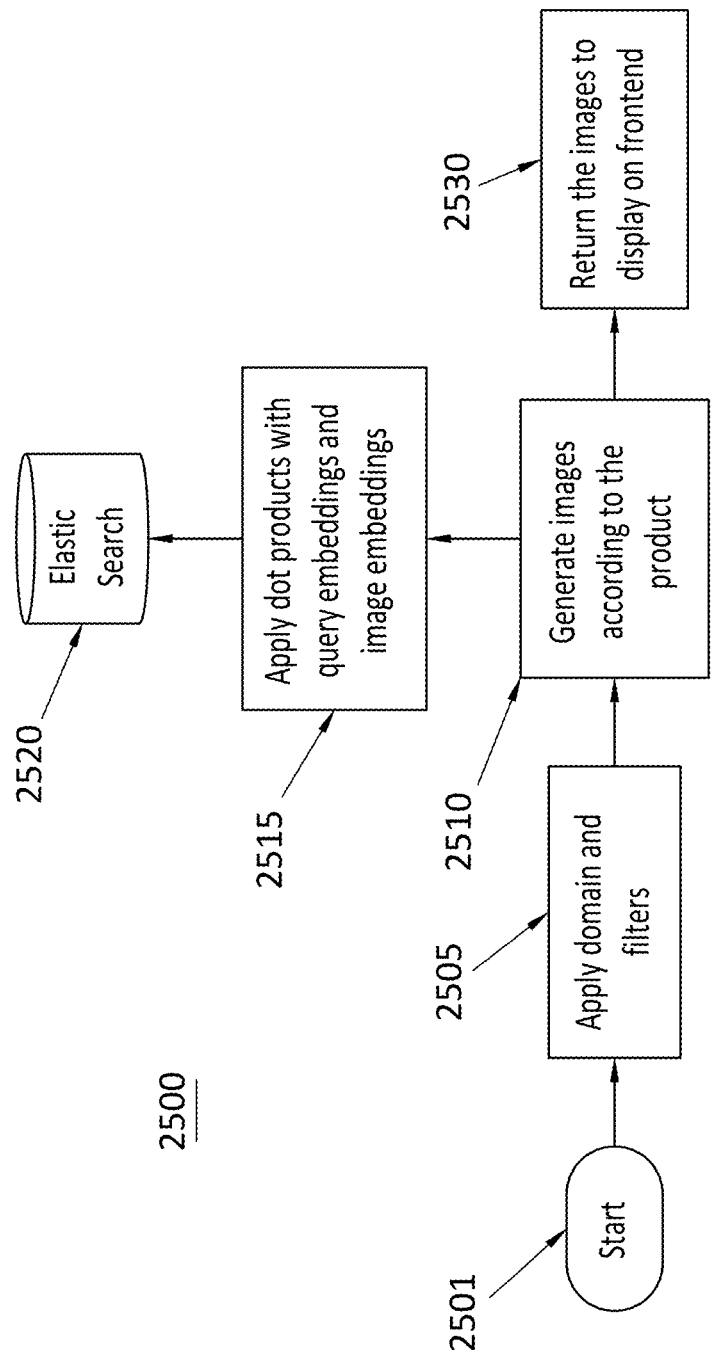
FIG. 25 is a process flow diagram of how an image search application programming interface (API) searches for and responds to an image search request, in accordance with one or more embodiments of the disclosed subject matter.

FIG. 25 is a process flow diagram of how the system searches for an image or images, in accordance with one or more embodiments of the disclosed subject matter. In FIG. 25, an image search flow diagram 2500 for a process of searching images stored in the system starts 2501 and applies 2505 domain and other filters to a query request to narrow and more efficiently target the scope of the search. The process 2500 then generates 2510 images in response to the filtered search request by applying 2515 a dot product search with query embeddings and image embeddings to search a vector database 2520, for example, but not limited to, the Elasticsearch® database, and returns and displays 2530 the images from the results in, for example, but not limited to, an image display screen in the system, which is similar to the output document display section 1470 shown in FIG. 14.

Figure 26:
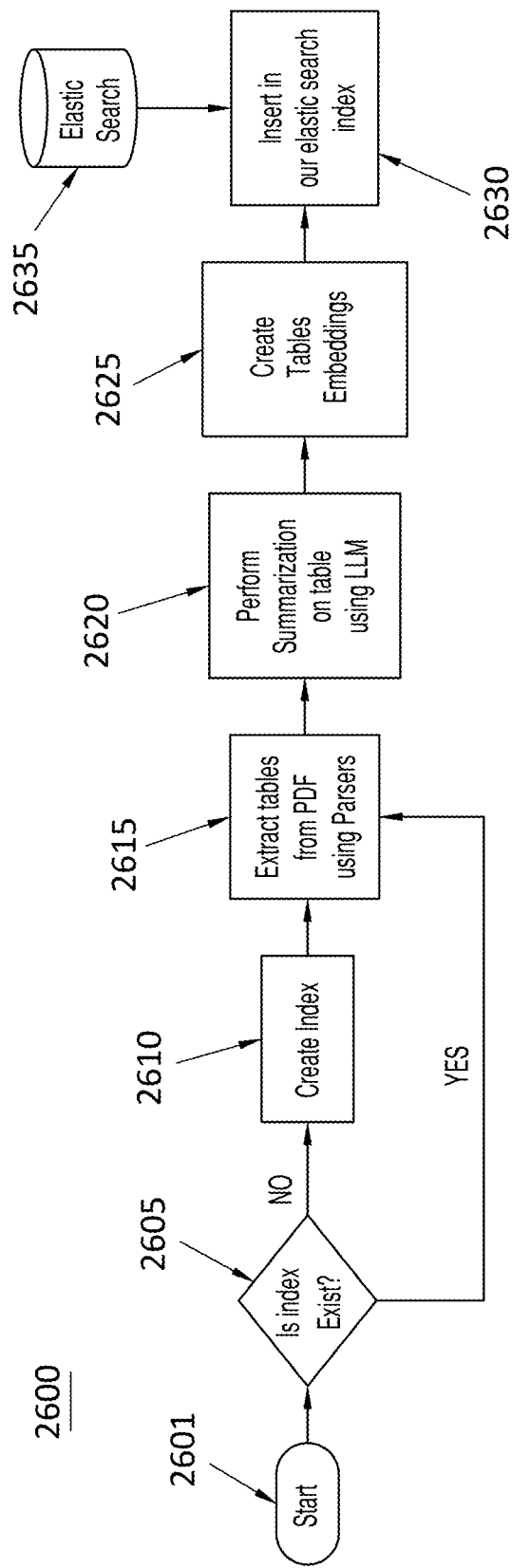
FIG. 26 is a process flow diagram of how a table index application programming interface (API) creates a table index and adds it to the system, in accordance with one or more embodiments of the disclosed subject matter.

FIG. 26 is a process flow diagram of a process for generating a table index of the tables present in a document, in accordance with one or more embodiments of the disclosed subject matter. In FIG. 26, a table index flow diagram 2600 for a process of searching images stored in the system starts 2601 and determines 2605 whether a table index exists. If it is determined 2605 that the table index does not exist, the process continues to create 2610 the index and then extract 2615 structured information from the document's tables using an appropriate parser. If it is determined 2605 that the table index does exist, then the process jumps ahead to the extract 2615 structured information from the document's tables using an appropriate parser step. The process continues and performs summarization 2620 on the tables from the document using an LLM to obtain a core meaning and significance of each table. The process continues and creates 2625 table embeddings, which are a blend of data and representation, where representation includes, but is not limited to, the specific way or format in which data is structured or encoded to convey information effectively, which can include methods or techniques used to transform data into a meaningful format. These embeddings encode the essence, that is, the meaning, content, and relevance, of each table. The process continues and inserts 2630 the table embeddings into a vector database 2635.

Figure 27:
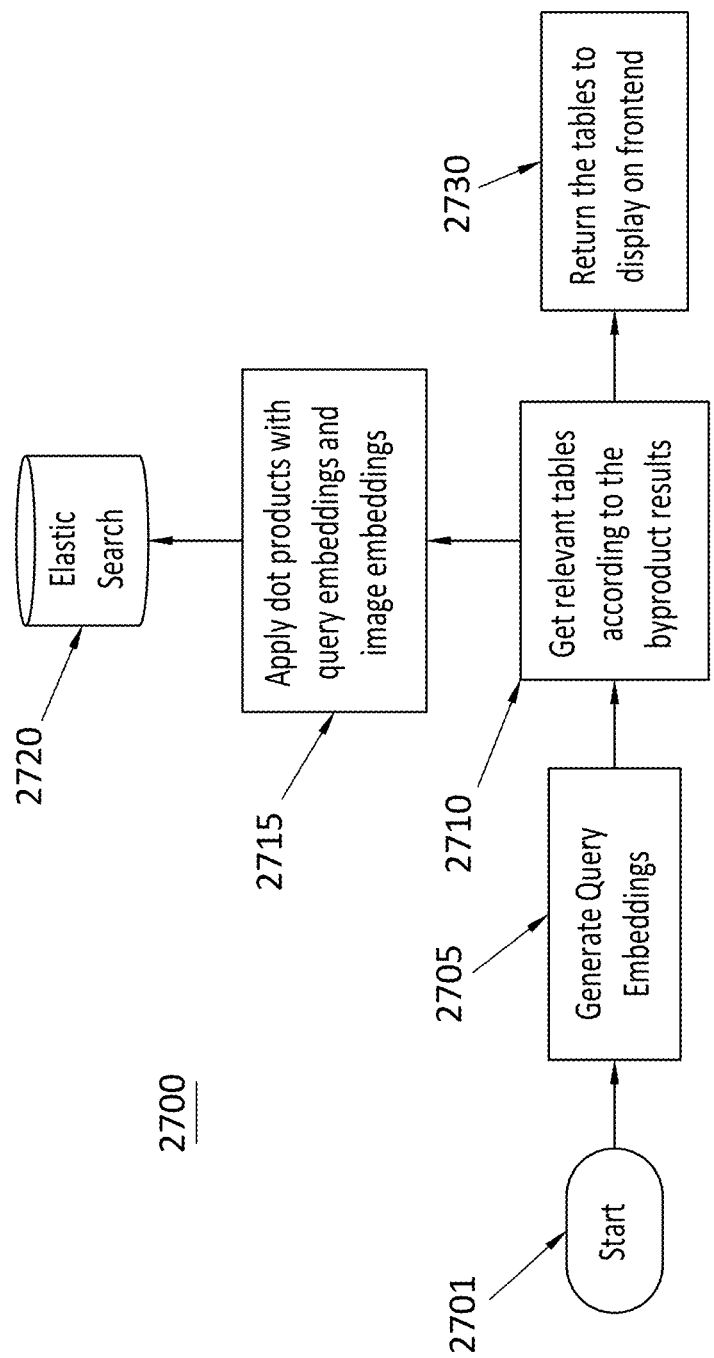
FIG. 27 is a process flow diagram of how a table search application programming interface (API) searches for and responds to a table search request, in accordance with one or more embodiments of the disclosed subject matter.

FIG. 27 is a process flow diagram of how the system searches for a table, in accordance with one or more embodiments of the disclosed subject matter. In FIG. 27, a table search flow diagram 2700 for a process for performing table searches within the system which starts 2701 and generates query embeddings 2705 by generating multiple representations of the search query. The process continues and obtains 2710 relevant tables using byproduct results by applying 2715 dot product searches with query embeddings and table embeddings in a vector database 2720, for example, but not limited to, the Elasticsearch® database and returns and displays 2730 the tables from the results in, for example, but not limited to, a table display screen in the system, which is similar to the output document display section 1470 shown in FIG. 14.

Figure 28:
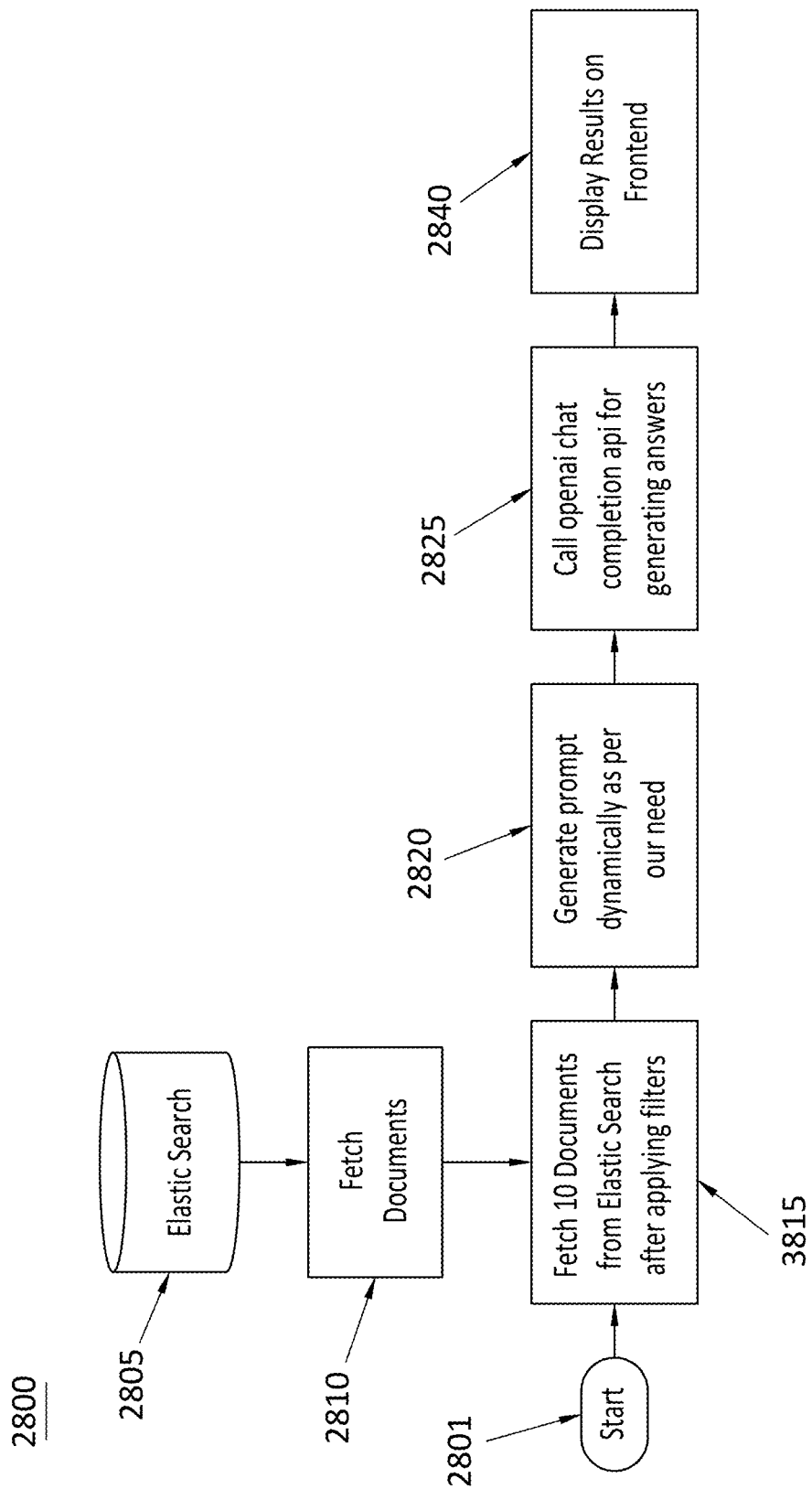
FIG. 28 is a process flow diagram of how a search flow application programming interface (API) searches for and responds to a multiple document search request, in accordance with one or more embodiments of the disclosed subject matter.

FIG. 28 is a process flow diagram of a search filter flow, in accordance with one or more embodiments of the disclosed subject matter. In FIG. 28, a search flow pipeline diagram 2800 starts 2801 and fetches 2815, 2810 documents after applying filters, in this embodiment, 10 documents, from a vector database 2805, for example, but not limited to, an Elasticsearch® database. 2815 makes a request to fetch additional data and 2810 retrieves the original documents and additional relevant metadata from the document store 2805 to enhance the search results. The information from 2810 and 2815 is synthesized and the process continues to generate 2820 dynamic prompts and then calls 2825 the open AI chat completion API to generate answers to the user query based on the fetched documents and then displays 2840 the result in, for example, but not limited to, a result display screen in the system, which is similar to the output document display section 1470 shown in FIG. 14.

Figure 29:
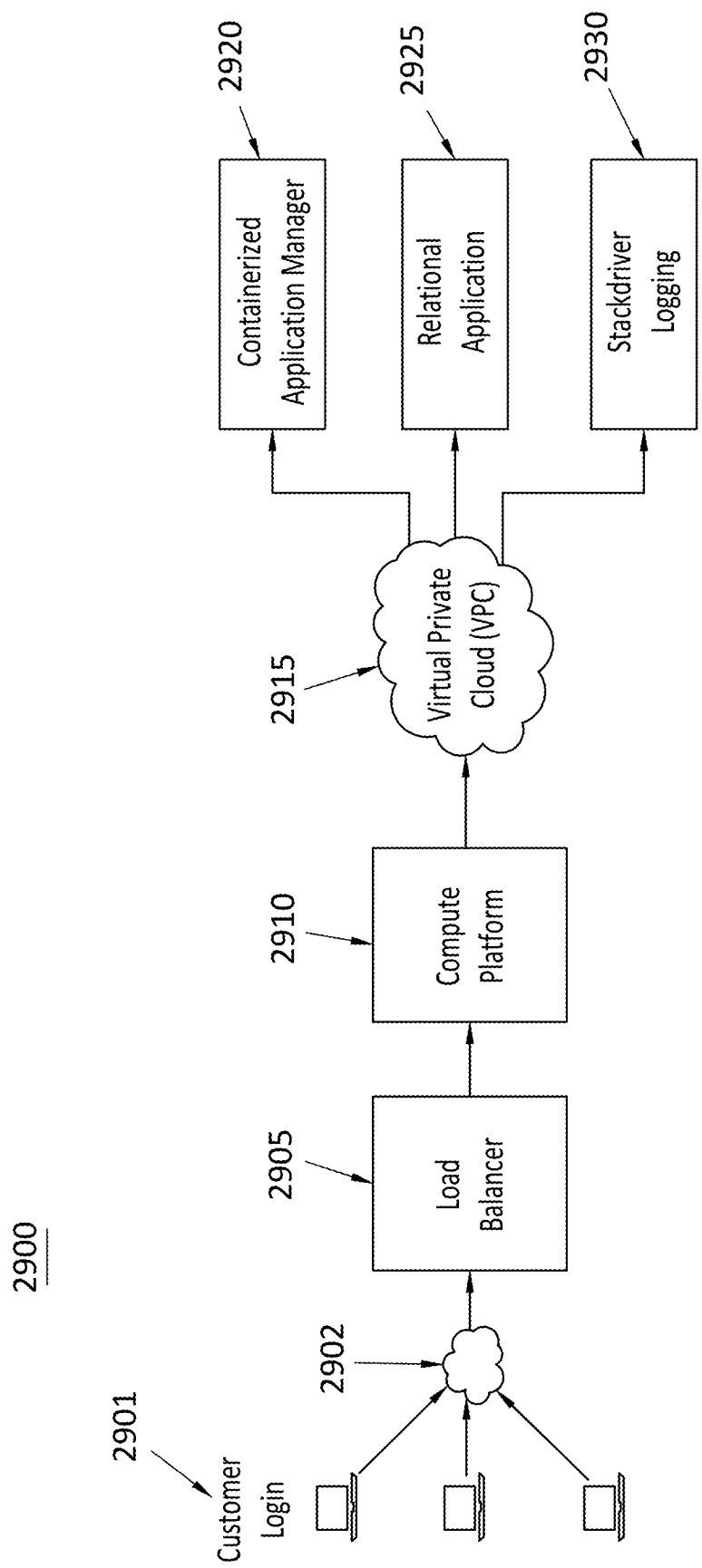
FIG. 29 is a system diagram of a computing system on which the system can be executed, in accordance with one or more embodiments of the disclosed subject matter.

FIG. 29 represents a comprehensive system architecture 2900, in accordance with one or more embodiments of the disclosed subject matter. In FIG. 29, the system architecture 2900 is a distributed architecture that includes a customer login component 2901, which can be implemented on the main screen 800 of the governed search system described herein and that is running on the customer's laptop computer, desktop computer, or workstation computer or workstation, thus affording users access to the system via a variety of diverse terminals. These terminals can be local or remotely communicatively connected via a communications network 2902 including, but not limited to, a local area network (LAN), wide area network (WAN), or the Internet, to a compute platform 2910, which can include, but is not limited to, at least one processor 2911, a memory 2912 communicatively connected to the processor 2911, at least one hard drive 2913 communicatively connected to the processor 2911 and the memory 2912, a set of executable instructions stored in the memory 2912 that, when executed by the processor 2911 generate a user interface configured to be used for cataloging and searching structured and unstructured documents using an active governance framework. The at least one processor 2911, in general, has multiple cores and can include, but is not limited to, at least one or any combination of a 7th generation Intel Core i5 processor, an Intel Xeon W processor, an AMD Threadripper Pro, an AMD Ryzen Threadripper 3990X 64-Core processor, an Nvidia Titan RTX processor, an Nvidia H100 processor, and the yet to be released Nvidia GH200 GPU. The memory 2912 can include, but is not limited to, a random-access memory (RAM), a static random-access memory (SDRAM), dynamic random access memory (DRAM), or a solid-state drive (SSD). For example, the compute platform 2910 can include a server, a laptop computer, a desktop computer, or a workstation computer or workstations that can include, but are not limited to, a 7th generation Intel Core i5 processor 2911, 16 GB of RAM 2912, and a 1 TB hard drive 2913. Ensuring balanced processing, a load balancer 2905 can be and is shown interlinked between the customer login component 2901 and the compute platform 2910, and is configured for timely and efficiently managing and distributing customer requests within the system. The compute platform 2910, which can include, but is not limited to, Google Cloud's Cloud Run, is configured to perform the execution of various applications and services, using, Cloud Run services to run code that responds to web requests or events, and Cloud Run jobs to run code that performs work (i.e., a job) and then quits when the work is done, and both using containers directly on top of a scalable cloud infrastructure. The cloud run instances allow deployment of add-on modules to deliver capabilities such as knowledge graph, proposal development, compliance and operations management. The compute platform 2910 is integrated with a virtual private cloud (VPC) 2915, which can use, for example, but is not limited to, Google Cloud's GCP to establish a secure and isolated environment for the system's data and processes. The compute platform 2910 can include any number of AI Workstations, generally with multiple Central Processing Units (CPUs) and/or Graphics Processing Units (GPUs) that are implemented and optimized for use with LLMs and generative AI models, including, for example, but not limited to, a 7th generation Intel Core i5 processor, 16 GB of RAM, and a 1 TB hard drive. Within the VPC, a containerized application manager 2920, which can include, but is not limited to, Google Cloud's GKE (Google Kubernetes Engine), controls the deployment and scaling of containers and microservices to ensure optimal scalability and resource allocation. The VPC 2915 additionally interfaces with a time-series relational database 2925, which can include, but is not limited to, PostgreSQL object-relational database system from The PostgreSQL Global Development Group, to provide structured data management and retrieval, which is a pivotal component for system efficiency. Furthermore, the VPC 2915 also interfaces with a stackdriver logging mechanism 2930, responsible for the systematic collection and maintenance of performance logs, which are instrumental in enhancing system review and refinement.

Figure 30:
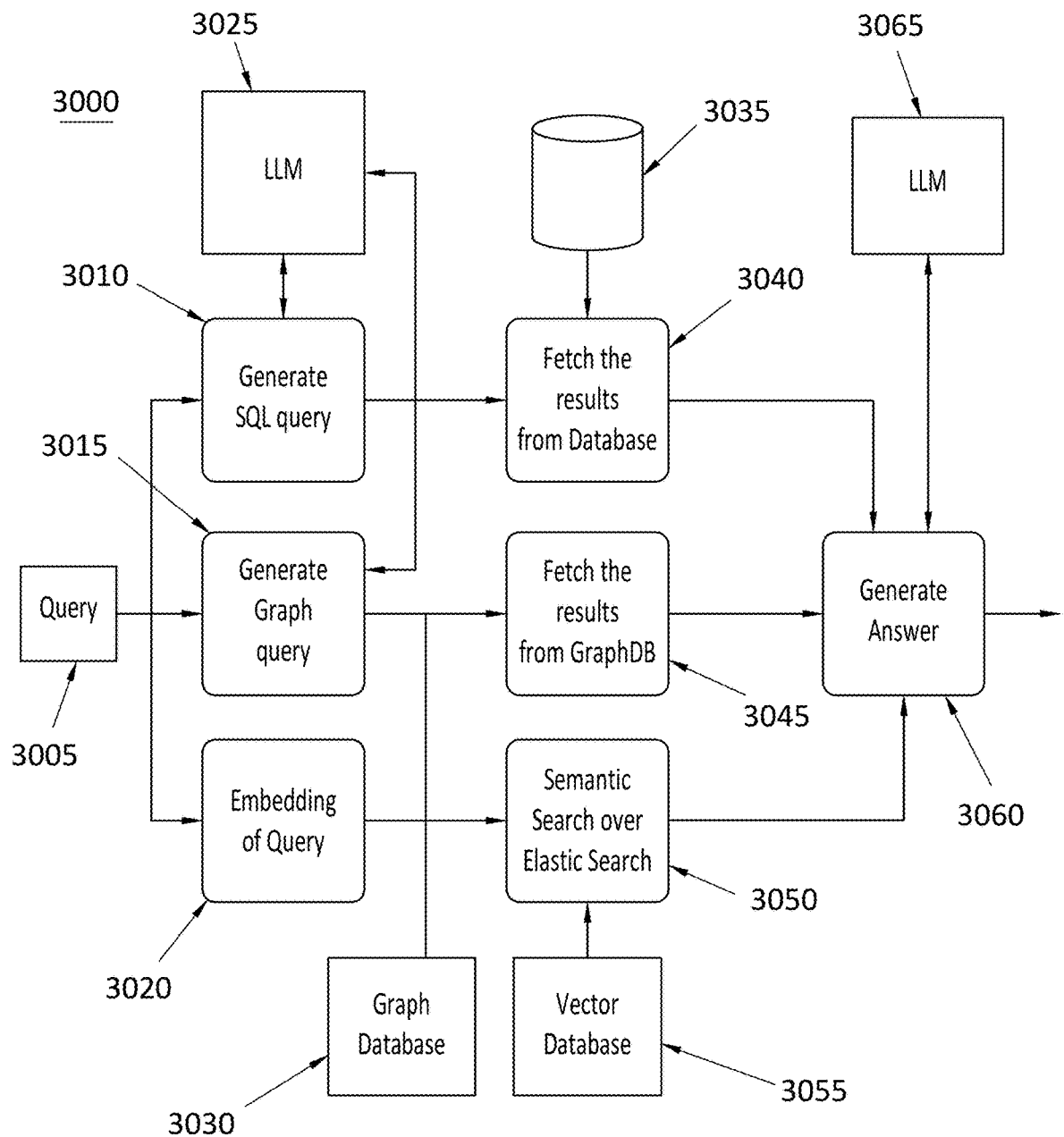
FIG. 30 is a process flow diagram that illustrates the system flow of the core components of a query and answer generation system, in accordance with one or more embodiments of the disclosed subject matter.

FIG. 30 is a process flow diagram that illustrates the system flow of the core components of a query and answer generation system, in accordance with one or more embodiments of the disclosed subject matter. In FIG. 30., a query and answer generation system 3000 is designed to efficiently and intelligently handle user queries for data located across diverse data sources, including SQL, graphDB, and text databases. The query and answer generation system 3000 represents a unique integration of linguistic and semantic technologies, which delivers precise and contextually relevant results.

In FIG. 30, the query and answer generation system 3000 includes a query input component 3005, which serves as the gateway through which users submit queries to the query and answer generation system 3000. Specifically, the query input component 3005 is communicatively connected to a generate SQL query component 3010, a generate graph query component 3015, and an embedding of query component 3020. The generate SQL query component 3010 and the generate graph query component 3015 are both communicatively connected to a large language model (LLM) 3025 and the generate graph query component 3015 is also communicatively connected to a graph database 3030. In FIG. 30, the LLM 3025 provides natural language understanding capabilities for the generate SQL query component 3010 and the generate graph query component 3015. The generate SQL query component 3010 is configured to translate user queries into and generate structured SQL queries that are tailored for relational databases. Simultaneously, the generate graph query component 3015 accesses the LLM 3025 and generates optimized queries, including for example, but not limited to, graph queries created using Cypher from Neo4j, Inc., for graph databases, for example, but not limited to, the graph database 3030.

In FIG. 30, the embedding of query component 3020 uses transformers to extract semantic information from the input user queries from the query component 3005 and converts them into numerical representations to facilitate the advanced semantic search capabilities of the query and answer generation system 3000. In FIG. 30, a fetch results from database component 3040 is communicatively connected to the generate SQL query component 3010 and a relational database 3035, and a fetch results from graph database component 3045 is communicatively connected to the generate graph query component 3015 and the graph database 3030. Each of these components facilitate data retrieval from their respective database sources. As described above, the fetch results from database component 3040 searches conventional relational databases, for example, the relational database 3035, using the queries generated by the generate SQL query component 3010. Similarly, the fetch results from graph database component 3045 searches specialized graph databases using the queries generated by the generate graph query component 3015 using for example, but not limited to, Cypher from Neo4j. The processes implemented in the two fetch components align with the structured queries generated in the generate SQL query component 3010, the generate graph query component 3015, and the embedding of query component 3020.

In FIG. 30, a semantic search component 3050 is communicatively connected to the embedding of query component 3020 and a vector database 3055. The semantic search component 3050 conducts semantic searches using the previously generated query embeddings in the vector database 3055 including, for example, but not limited to, the Elasticsearch® database. The vector database's 3055 efficiency in indexing and information retrieval significantly enhances search accuracy. Each of the fetch results from database component 3040, the fetch results from graph database component 3045, and the semantic search component 3050 are communicatively connected to a generate answer component 3060. The generate answer component 3060 amalgamates results from the preceding stages to ensure a seamless integration of the information retrieved from the relational database 3035 and the graph database 3030, with the semantic search results. Specifically, the generate answer component 3060 leverages the linguistic expertise of a second LLM 3065 to construct coherent, contextually relevant responses to user queries and then can display the result in, for example, but not limited to, a result display screen in the system, which is similar to the output document display section 1470 shown in FIG. 14.

In an embodiment of the presently described subject matter, a computer-implemented method of enabling one or more computing devices of a document system for cataloging and searching structured and unstructured documents using an active governance framework, the method including: receiving, by a computing device, at least one document; generating, by the computing device, using the active governance framework at least one parsed document in at least one domain from the at least one document where the at least one parsed document includes a plurality of data elements that have been classified and categorized based on the content of the at least one document; storing, by the computing device, using the active governance framework the plurality of data elements from the at least one document based on a type of the plurality of data elements in at least one of a vector database, a graph database, and a relational database; receiving, by the computing device, a data request for information from the document system; generating, by the computing device, using the active governance framework a plurality of queries using the received data request and a first large language model; receiving, by the computing device, using the active governance framework a set of data elements from the plurality of data elements stored on the at least one of the vector database, the graph database, and the relational database that are responsive to the generated plurality of queries; generating, by the computing device, using the active governance framework from the received set of data elements from the plurality of data elements using a second large language model and the active governance framework, a document from the set of data elements that is responsive to the data request; and displaying, by the computing device, the generated document in response to the data request in a user interface in a predefined format.

In an embodiment of the presently described subject matter, a computer-implemented method of enabling one or more computing devices of a document system for cataloging and searching structured and unstructured documents using an active governance framework, the method including: receiving, by a computing device, via a first user interface executing on the computing device, at least one document; generating, by the computing device, at least one parsed document in at least one domain from the at least one document where the at least one parsed document includes a plurality of data elements that have been classified and categorized based on the content of the at least one document; storing, by the computing device, the plurality of data elements from the at least one document in the document system in at least one of a vector database, a graph database, and a relational database; receiving, by the computing device, via a second user interface executing on the computing device, a data request for information from the document system; generating a plurality of queries using the received data request and a first large language model; receiving a set of data elements from the plurality of data elements stored on the at least one of the vector database, the graph database, and the relational database that are responsive to the generated plurality of queries; generating, by the computing device, from the received set of data elements from the plurality of data elements using a second large language model, a document from the set of data elements that is responsive to the data request; and displaying, by the computing device, the generated document in response to the data request in a third user interface.

In an embodiment of the presently described subject matter, a governed search system for cataloging and searching structured and unstructured documents using an active governance framework, the system including: an integrated platform including at least one processor, a memory connected to the at least one processor, a set of executable instructions stored in the memory that, when executed by the at least one processor generate a graphical user interface configured to enable and control user access to the integrated platform; the set of executable instructions, when executed by the at least one processor, configure the integrated patient platform to: receive, by a computing device, via a first user interface executing on the computing device, at least one document; generate, by the computing device, at least one parsed document in at least one domain from the at least one document where the at least one parsed document includes a plurality of data elements that have been classified and categorized based on the content of the at least one document; store, by the computing device, the plurality of data elements from the at least one document in the document system in at least one of a vector database, a graph database, and a relational database; receive, by the computing device, via a second user interface executing on the computing device, a data request for information from the document system; generate a plurality of queries using the received data request and a first large language model; receive a set of data elements from the plurality of data elements stored on the at least one of the vector database, the graph database, and the relational database that are responsive to the generated plurality of queries; generate, by the computing device, from the received set of data elements from the plurality of data elements using a second large language model, a document from the set of data elements that is responsive to the data request; and display, by the computing device, the generated document in response to the data request in a third user interface.

While the above description provides a full and complete disclosure of the preferred embodiments of this invention, various modifications, alternate constructions, and equivalents may be employed without departing from the spirit and scope of the invention. Therefore, the above description and illustrations should not be construed as limiting the scope of the invention, which is defined by the appended claims.

What is claimed is:

1. A computer-implemented method of enabling one or more computing devices of a document system for cataloging and searching structured and unstructured documents using an active governance framework, the method comprising:

receiving, by a computing device, at least one document;

generating, by the computing device, using the active governance framework at least one parsed document in at least one domain from the at least one document where the at least one parsed document includes a plurality of data elements that have been classified and categorized based on content of the at least one document;

storing, by the computing device, using the active governance framework the plurality of data elements from the at least one document based on a type of the plurality of data elements in at least one of a vector database, a graph database, and a relational database;

receiving, by the computing device, a data request for information from the document system, the data request including a plurality of proposal requirements;

generating, by the computing device, using the active governance framework a plurality of queries using the received data request and a first large language model;

receiving, by the computing device, using the active governance framework a set of data elements from the plurality of data elements stored on the at least one of the vector database, the graph database, and the relational database that are responsive to the generated plurality of queries;

generating, by the computing device, using the active governance framework from the received set of data elements from the plurality of data elements using a second large language model and the active governance framework, a generated document from the set of data elements that is responsive to the data request, where the generated document is a draft proposal responsive to the plurality of proposal requirements; and displaying, by the computing device, the generated document in response to the data request in a user interface in a predefined format, where the user interface includes a first portion to display a source documents section configured to display and permit review of source documents used to generate the generated document, a second portion configured to display the generated document, and a third section configured to permit a user to query the generated document via a chat message entry area and display responses in a chat section.

2. The computer-implemented method of claim 1, wherein the receiving, by a computing device, at least one document comprises:

determining, by the computing device, whether the at least one document is in a portable document format (pdf) and if not, converting the received document to a pdf document.

3. The computer-implemented method of claim 2, wherein the generating, by the computing device, using the active governance framework at least one parsed document in at least one domain comprises:

generating from the pdf document, by the computing device, the at least one parsed document in the at least one domain.

4. The computer-implemented method of claim 3, wherein the generating, by the computing device, using the active governance framework at least one parsed document in the at least one domain further comprises:

determining whether any portion of the pdf document was unparsed and, if so, parsing the unparsed portion of the pdf document.

5. The computer-implemented method of claim 4, wherein the determining whether any portion of the pdf document was unparsed and, if so, parsing the unparsed portion of the pdf document comprises:

determining whether any portion of the pdf document was unparsed and, if so, determining which parser to use and parsing the unparsed portion of the pdf document using the determined parser; and storing the parsed unparsed portion of the pdf document in the at least one parsed document in the at least one domain.

6. The computer-implemented method of claim 5, wherein the generating, by the computing device, the at least one parsed document in at least one domain comprises:

converting human readable/discernable text, images, tables, and relationships therebetween in the pdf document into a number-based representation of the human readable/discernable text, images, tables, and relationships therebetween.

7. The computer-implemented method of claim 6, wherein the storing, by the computing device, the plurality of data elements from the at least one document based on a type of the plurality of data elements in at least one of a vector database, a graph database, and a relational database comprises:

storing, by the computing device, a number-based representation of the plurality of data elements from the at least one document in the vector database.

8. The computer-implemented method of claim 7, wherein the storing, by the computing device, the plurality of data elements from the at least one document based on a type of the plurality of data elements in at least one of a vector database, a graph database, and a relational database further comprises:

storing, by the computing device, graph-based representations from the plurality of data elements from the at least one document in the graph database.

9. The computer-implemented method of claim 8, wherein the storing, by the computing device, the plurality of data elements from the at least one document based on a type of the plurality of data elements in at least one of a vector database, a graph database, and a relational database further comprises:

storing, by the computing device, text-based representations from the plurality of data elements from the at least one document in the relational database.

10. The computer-implemented method of claim 9, wherein the receiving, by the computing device, a data request for information from the at least one document comprises:

receiving, by the computing device, via a query user interface a data request for information from the at least one document.

11. The computer-implemented method of claim 10, wherein the generating, by the computing device, using the active governance framework a plurality of queries using the received data request and a first large language model comprises:

generating, by the computing device, a structured query language (SQL) query from the received data request and the first large language model for the relational database;

generating, by the computing device, a graph query language query from the received data request and the first large language model for the graph database; and generating, by the computing device, a vector query language query from the received data request for the vector database.

12. The computer-implemented method of claim 11, wherein the receiving, by the computing device, a set of data elements from the plurality of data elements stored on the at least one of the vector database, the graph database, and the relational database that are responsive to the generated plurality of queries comprises:

receiving, by the computing device, a set of text-based data elements from the plurality of data elements stored on the relational database;

receiving, by the computing device, a set of graph-based data elements from the plurality of data elements stored on the graph database; and receiving, by the computing device, a set of number-based data elements from the plurality of data elements stored on the vector database.

13. The computer-implemented method of claim 12, wherein the generating, by the computing device, from the received set of data elements from the plurality of data elements using a second large language model, a generated document from the set of data elements that is responsive to the data request comprises:

generating, by the computing device, from the received set of text-based data elements from the plurality of data elements stored on the relational database using the second large language model, a first portion of the generated document from the set of data elements that is responsive to the data request;

generating, by the computing device, from the received set of graph-based data elements from the plurality of data elements stored on the graph database using the second large language model, a second portion of the generated document from the set of data elements that is responsive to the data request;

generating, by the computing device, from the received set of number-based data elements from the plurality of data elements stored on the vector database using the second large language model, a third portion of the generated document from the set of data elements that is responsive to the data request; and combining the first portion of the generated document, the second portion of the generated document, and the third portion of the generated document into the generated document.

14. A computer-implemented method of enabling one or more computing devices of a document system for cataloging and searching structured and unstructured documents using an active governance framework, the method comprising:

receiving, by a computing device, via a first user interface executing on the computing device, at least one document, a data request including a plurality of proposal requirements;

generating, by the computing device, at least one parsed document in at least one domain from the at least one document where the at least one parsed document includes a plurality of data elements that have been classified and categorized based on content of the at least one document;

storing, by the computing device, the plurality of data elements from the at least one document in the document system in at least one of a vector database, a graph database, and a relational database;

receiving, by the computing device, via a second user interface executing on the computing device, a data request for information from the document system;

generating a plurality of queries using the received data request and a first large language model;

receiving a set of data elements from the plurality of data elements stored on the at least one of the vector database, the graph database, and the relational database that are responsive to the generated plurality of queries;

generating, by the computing device, from the received set of data elements from the plurality of data elements using a second large language model, a generated document from the set of data elements that is responsive to the data request, where the generated document is a draft proposal responsive to the plurality of proposal requirements; and displaying, by the computing device, the generated document in response to the data request in a third user interface, where the third user interface includes a first portion to display a source documents section configured to display and permit review of all source documents used to generate the generated document, a second portion configured to display the generated document, and a third section configured to permit a user to adjust information in the generated document.

15. The computer-implemented method of claim 14, wherein the receiving, by a computing device, via a first user interface executing on the computing device, at least one document comprises:

receiving, by the computing device, via a file input window displayed over the first user interface executing on the computing device, the at least one document.

16. The computer-implemented method of claim 15 further comprises:

receiving, by the computing device, via a file upload field in the file input window displayed over the first user interface executing on the computing device, the at least one document.

17. The computer-implemented method of claim 16 further comprises:

receiving, by the computing device, via a scrollable listing of available source domains in the file input window displayed over the first user interface executing on the computing device, a source domain selection for the at least one document.

18. The computer-implemented method of claim 17 wherein receiving, by the computing device, via a second user interface executing on the computing device, a data request for information from the document system comprises:

receiving, by the computing device, via a query input field in the second user interface executing on the computing device, a natural language request for information from the document system.

19. The computer-implemented method of claim 18 wherein displaying, by the computing device, the generated document in response to the data request in a third user interface comprises:

displaying, by the computing device, the generated document in response to the data request in a scrollable answer field in the third user interface.

20. The computer-implemented method of claim 19 wherein displaying, by the computing device, in a third user interface the generated document in response to the data request comprises:
  displaying, by the computing device, in a source field in the third user interface a link to and information on at least one source document used to create the generated document in response to the data request; and
  displaying, by the computing device, via an editable query input field in the third user interface the received natural language request for information from the document system.

21. The computer-implemented method of claim 20 wherein displaying, by the computing device, in a third user interface the generated document in response to the data request further comprises:
  displaying, by the computing device, a plurality of menu icons in the third user interface, where each of the plurality of menu icons is configured, when selected, to open a functional menu to refine a specific query element to refine the generated document.

22. The computer-implemented method of claim 21 wherein displaying, by the computing device, in a third user interface the generated document in response to the data request further comprises:
  displaying, by the computing device, a references section in the third user interface, where each reference used to create the generated document is listed.

23. The computer-implemented method of claim 22 wherein displaying, by the computing device, in a third user interface the generated document in response to the data request further comprises:
  displaying, by the computing device, a other drafts section in the third user interface, where each prior draft of the generated document is available.

24. A governed search system for cataloging and searching structured and unstructured documents using an active governance framework, the system comprising:
  an integrated platform including at least one processor, a memory connected to the at least one processor, a set of executable instructions stored in the memory that, when executed by the at least one processor generate a graphical user interface configured to enable and control user access to the integrated platform;
  the set of executable instructions, when executed by the at least one processor, configure the integrated platform to:
  receive, by a computing device, via a first user interface executing on the computing device, at least one document;
  generate, by the computing device, at least one parsed document in at least one domain from the at least one document where the at least one parsed document includes a plurality of data elements that have been classified and categorized based on content of the at least one document;
  store, by the computing device, the plurality of data elements from the at least one document in a document system in at least one of a vector database, a graph database, and a relational database;
  receive, by the computing device, via a second user interface executing on the computing device, a data request for information from the document system, the data request including a plurality of proposal requirements;
  generate a plurality of queries using the received data request and a first large language model;
  receive a set of data elements from the plurality of data elements stored on the at least one of the vector database, the graph database, and the relational database that are responsive to the generated plurality of queries;
  generate, by the computing device, from the received set of data elements from the plurality of data elements using a second large language model, a generated document from the set of data elements that is responsive to the data request, where the generated document is a draft proposal responsive to the plurality of proposal requirements; and
  display, by the computing device, the generated document in response to the data request in a third user interface, where the third user interface includes a first portion to display a source documents section configured to display and permit review of all source documents used to generate the generated document, a second portion configured to display the generated document, and a third section configured to permit a user to adjust information in the generated document.

25. The governed search system of claim 24, wherein receive, computing device, via a first user interface executing on the computing device, at least one document comprises:
  receive, by the computing device, via a file input window displayed over the first user interface executing on the computing device, the at least one document.

26. The governed search system of claim 25 further comprises:
  receive, by the computing device, via a file upload field in the file input window displayed over the first user interface executing on the computing device, the at least one document.

27. The governed search system of claim 26 further comprises:
  receive, by the computing device, via a scrollable listing of available source domains in the file input window displayed over the first user interface executing on the computing device, a source domain selection for the at least one document.

28. The governed search system of claim 27 wherein receive, by the computing device, via a second user interface executing on the computing device, a data request for information from the document system comprises:
  receive, by the computing device, via a query input field in the second user interface executing on the computing device, a natural language request for information from the document system.

29. The governed search system of claim 28 wherein display, by the computing device, the generated document in response to the data request in a third user interface comprises:
  display, by the computing device, the generated document in response to the data request in a scrollable answer field in the third user interface.

30. The governed search system of claim 29 wherein display, by the computing device, in a third user interface the generated document in response to the data request comprises:
  display, by the computing device, in a source field in the third user interface a link to and information on at least one source document used to create the generated document in response to the data request; and display, by the computing device, via an editable query input field in the third user interface the received natural language request for information from the document system.

* * * * *